US011461585B2

(12) United States Patent
Shiraishi

(10) Patent No.: US 11,461,585 B2
(45) Date of Patent: Oct. 4, 2022

(54) IMAGE COLLECTION APPARATUS, IMAGE COLLECTION SYSTEM, IMAGE COLLECTION METHOD, IMAGE GENERATION APPARATUS, IMAGE GENERATION SYSTEM, IMAGE GENERATION METHOD, AND PROGRAM

(71) Applicant: NEC CORPORATION, Tokyo (JP)

(72) Inventor: Soma Shiraishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 53 days.

(21) Appl. No.: 16/977,252

(22) PCT Filed: Mar. 2, 2018

(86) PCT No.: PCT/JP2018/008144
§ 371 (c)(1),
(2) Date: Sep. 1, 2020

(87) PCT Pub. No.: WO2019/167277
PCT Pub. Date: Sep. 6, 2019

(65) Prior Publication Data
US 2021/0042571 A1 Feb. 11, 2021

(51) Int. Cl.
*G06T 7/90* (2017.01)
*G06K 9/62* (2022.01)
*G06V 10/20* (2022.01)

(52) U.S. Cl.
CPC ......... *G06K 9/6234* (2013.01); *G06K 9/6256* (2013.01); *G06K 9/6262* (2013.01); *G06T 7/90* (2017.01); *G06V 10/255* (2022.01)

(58) Field of Classification Search
CPC ...... G06K 9/6289; G06K 9/6256; G06K 9/34; G06K 9/4652; G06T 7/90
See application file for complete search history.

(56) References Cited

FOREIGN PATENT DOCUMENTS

| | | | |
|---|---|---|---|
| JP | 2008-097191 | A | 4/2008 |
| JP | 2010-213124 | A | 9/2010 |
| JP | 2014-178957 | A | 9/2014 |
| JP | 2016-062545 | A | 4/2016 |
| JP | 2016-181068 | A | 10/2016 |

OTHER PUBLICATIONS

International Search Report for PCT/JP2018/008144, dated May 29, 2018.

*Primary Examiner* — Sam Bhattacharya
(74) *Attorney, Agent, or Firm* — Sughrue Mion, PLLC

(57) ABSTRACT

An image collection system includes an image collection apparatus, an image capturing apparatus, and a display. The display includes a display surface that is also used as a placement surface of an object. The image capturing apparatus captures the object placed on the display surface of the display. The image collection apparatus includes a display control unit and an image acquisition unit. The display control unit switches and displays a plurality of first images each having a different content on the display surface of the display when the object is captured. The image acquisition unit acquires a plurality of second images generated by capturing the object on the display surface of the display while the plurality of first images are switched and displayed, and stores the plurality of second images in a storage apparatus.

14 Claims, 17 Drawing Sheets

10
IMAGE COLLECTION APPARTUS
1040
1020
1030
PROCESSOR
MEMORY
STORAGE DEVICE
BUS
1010
1050
INPUTOUTPUT INTERFACE
NETWORK INTERFACE
1060
30
IMAGE CAPTURING APPARTUS
OBJ
DISPLAY
40

USER
10
IMAGE COLLECTION APPARTUS
30
IMAGE CAPTURING APPARTUS
40
DISPLAY
S102
PLACE PRODUCT ON DISPLAY
S104
INPUT EXECUTION INSTRUCTION OF PROCESSING
EXECUTION INSTRUCTION
<S106>
DRAWING DATA OF FIRST IMAGE
S108
SWITCH AND DISPLAY PLURALITY OF FIRST IMAGES
<S110>
CAPTURING INSTRUCTION
S112
PERFORM CAPTURING
SECOND IMAGE
S114
STORE PLURALITY OF SECOND IMAGES IN STORAGE APPARTUS

START
DISPLAY PLURALITY OF SECOND IMAGES ACQUIRED BY IMAGE ACQUISITION UNIT
S202
ACQUIRE CORRECT INFORMATION FOR EACH SECOND IMAGE
S204
GENERATE OR UPDATE OBJECT IDENTIFICATION ENGINE BASED ON PLURALITY OF SECOND IMAGES AND CORRECT INFORMATION FOR EACH SECOND IMAGE
S206
END

START
INPUT PLURALITY OF SECOND IMAGES ACQUIRED BY IMAGE ACQUISITION UNIT TO OBJECT IDENTIFICATION ENGINE
S302
DISPLAY IDENTIFICATION RESULT
S304
IS THERE ERROR IN IDENTIFICATION RESULT?
S306
NO
YES
ACQUIRE MODIFIED INFORMATION
S308
UPDATE OBJECT IDENTIFICATION ENGINE BASED ON MODIFIED INFORMATION
S310
END

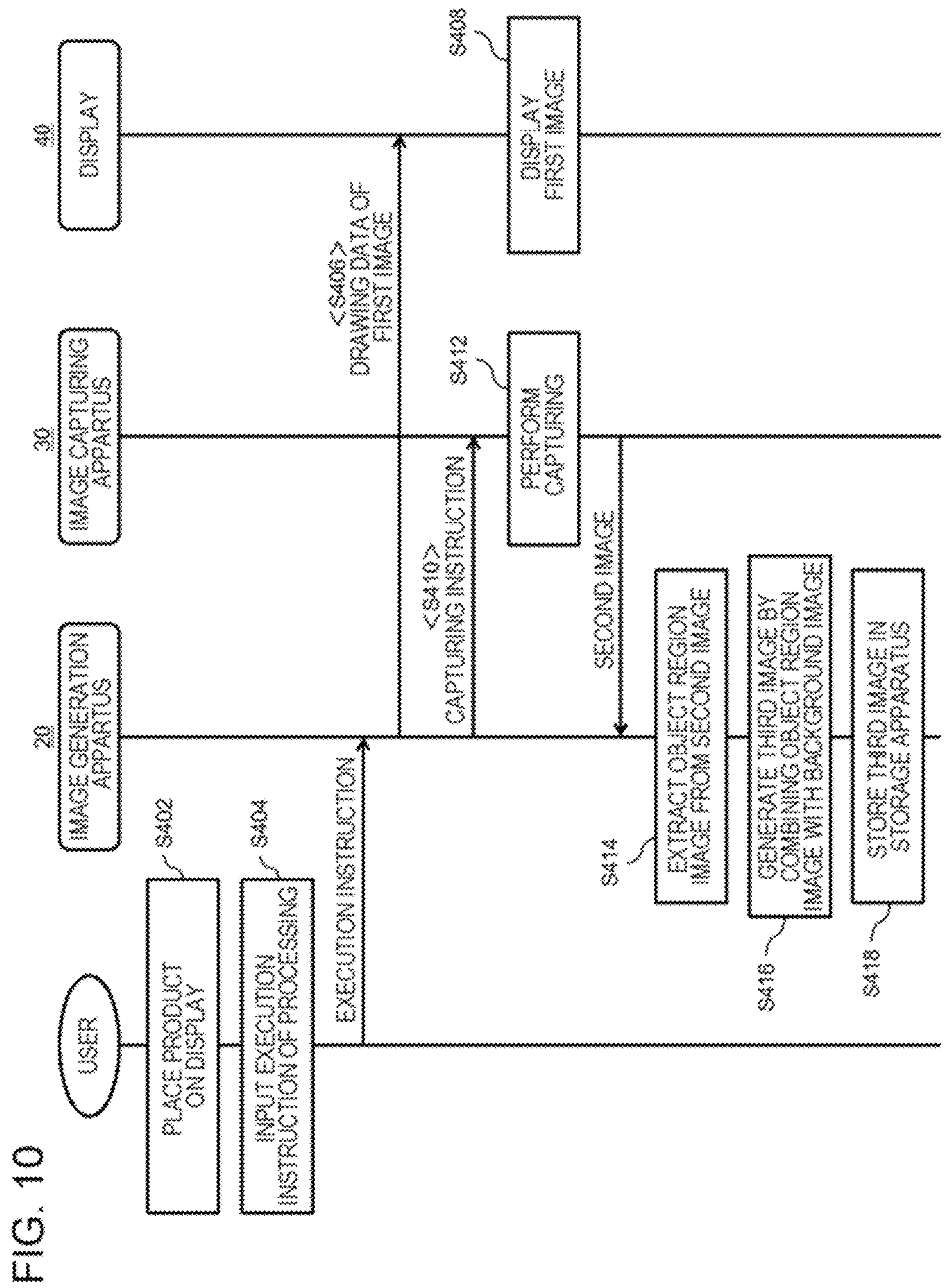
FIG. 10
USER
20
IMAGE GENERATION APPARTUS
30
IMAGE CAPTURING APPARTUS
40
DISPLAY
PLACE PRODUCT ON DISPLAY
S402
INPUT EXECUTION INSTRUCTION OF PROCESSING
S404
EXECUTION INSTRUCTION
<S406> DRAWING DATA OF FIRST IMAGE
<S410> CAPTURING INSTRUCTION
S412
PERFORM CAPTURING
S408
DISPLAY FIRST IMAGE
SECOND IMAGE
S414
EXTRACT OBJECT REGION IMAGE FROM SECOND IMAGE
S416
GENERATE THIRD IMAGE BY COMBINING OBJECT REGION IMAGE WITH BACKGROUND IMAGE
S418
STORE THIRD IMAGE IN STORAGE APPARATUS 1d
ABC
DISPLAY
OBJ
40
M2
2d
CAPTURE
P2
EXTRACT OBJECT
REGION IMAGE BY
USING MASK IMAGE M2

R
W
B
1f
R
W
B
OBJ
2f
L
$M_R$
$M_W$
$M_B$
M3'

$2_A$
$2_B$
EXTRACT
EXTRACT
$P_A$
$P_B$
PRODUCT A
PRODUCT B
COMBINE WITH BACKGROUND IMAGE
3
PRODUCT B
PRODUCT B
PRODUCT A

IMAGE COLLECTION APPARATUS, IMAGE COLLECTION SYSTEM, IMAGE COLLECTION METHOD, IMAGE GENERATION APPARATUS, IMAGE GENERATION SYSTEM, IMAGE GENERATION METHOD, AND PROGRAM

CROSS REFERENCE TO RELATED APPLICATIONS

This application is a National Stage of International Application No. PCT/JP2018/008144 filed Mar. 2, 2018.

TECHNICAL FIELD

The present invention relates to an object recognition technique using an image.

BACKGROUND ART

One example of techniques for recognizing an object using an image is disclosed in PTL 1 described below, for example. PTL 1 described below discloses a product registration apparatus including functions of identifying a target captured by a camera as a product by performing object recognition on the target, and registering the product as a product to be purchased.

CITATION LIST

Patent Literature

[PTL 1] Japanese Unexamined Patent Application Publication No. 2016-62545

SUMMARY OF INVENTION

Technical Problem

To make an object recognizable by using an image, a great number of images for learning and an evaluation needs to be prepared for each object to be identified, and work for constructing a discriminator by using the images is needed. The work requires an enormous amount of time and effort.

The present invention has been made in view of the above-described problem. One of objects of the present invention is to provide a technique for reducing time and effort for constructing a discriminator being used for object recognition.

Solution to Problem

An image collection apparatus according to the present invention includes:

a display control unit that switches and displays a plurality of first images each having a different content on a display surface of a display when an object placed on the display surface of the display is captured; and an image acquisition unit that acquires a plurality of second images being generated by capturing the object on the display surface of the display while the plurality of first images are switched and displayed, and stores the plurality of second images in a storage apparatus.

An image collection system according to the present invention includes:

a display including a display surface being used as a placement surface of an object;

an image capturing apparatus that captures an object placed on the display surface of the display;

a display control unit that switches and displays a plurality of first images each having a different content on the display surface of the display when the object is captured; and an image acquisition unit that acquires a plurality of second images being generated by capturing the object on the display surface of the display while the plurality of first images are switched and displayed, and stores the plurality of second images in a storage apparatus.

An image collection method according to the present invention includes:

by a computer, switching and displaying a plurality of first images each having a different content on a display surface of a display when an object placed on the display surface of the display is captured; and acquiring a plurality of second images being generated by capturing the object on the display surface of the display while the plurality of first images are switched and displayed, and storing the plurality of second images in a storage apparatus.

A first program according to the present invention causes a computer to execute the image collection method described above.

An image generation apparatus according to the present invention includes:

a display control unit that displays a predetermined first image on a display surface of a display when an object placed on the display surface of the display is captured;

an image acquisition unit that acquires a second image being generated by capturing the object on the display surface of the display while the first image is displayed;

an extraction unit that extracts an object region image indicating a region of the object from the second image; and an image generation unit that generates a third image by combining the object region image with a background image, and stores the third image in a storage apparatus.

An image generation system according to the present invention includes:

a display including a display surface being used as a placement surface of an object;

an image capturing apparatus that captures an object placed on the display surface of the display;

a display control unit that displays a predetermined first image on the display surface of the display when the object is captured;

an image acquisition unit that acquires a second image being generated by capturing the object on the display surface of the display while the first image is displayed;

an extraction unit that extracts an object region image indicating a region of the object from the second image; and an image generation unit that generates a third image by combining the object region image with a background image, and stores the third image in a storage apparatus.

An image generation method according to the present invention includes:

by a computer, displaying a predetermined first image on a display surface of a display when an object placed on the display surface of the display is captured;

acquiring a second image being generated by capturing the object on the display surface of the display while the first image is displayed;

extracting an object region image indicating a region of the object from the second image; and generating a third image by combining the object region image with another background image, and storing the third image in a storage apparatus.

A second program according to the present invention causes a computer to execute the image generation method described above.

Advantageous Effects of Invention

According to the present invention, it is possible to reduce time and effort for constructing a discriminator being used for object recognition.

BRIEF DESCRIPTION OF DRAWINGS

The above-described object, the other objects, features, and advantages will become more apparent from suitable example embodiments described below and the following accompanying drawings.

FIG. 10 is a sequence diagram illustrating a flow of processing of the image generation system 2 according to a third example embodiment.

EXAMPLE EMBODIMENT

Figure 1:
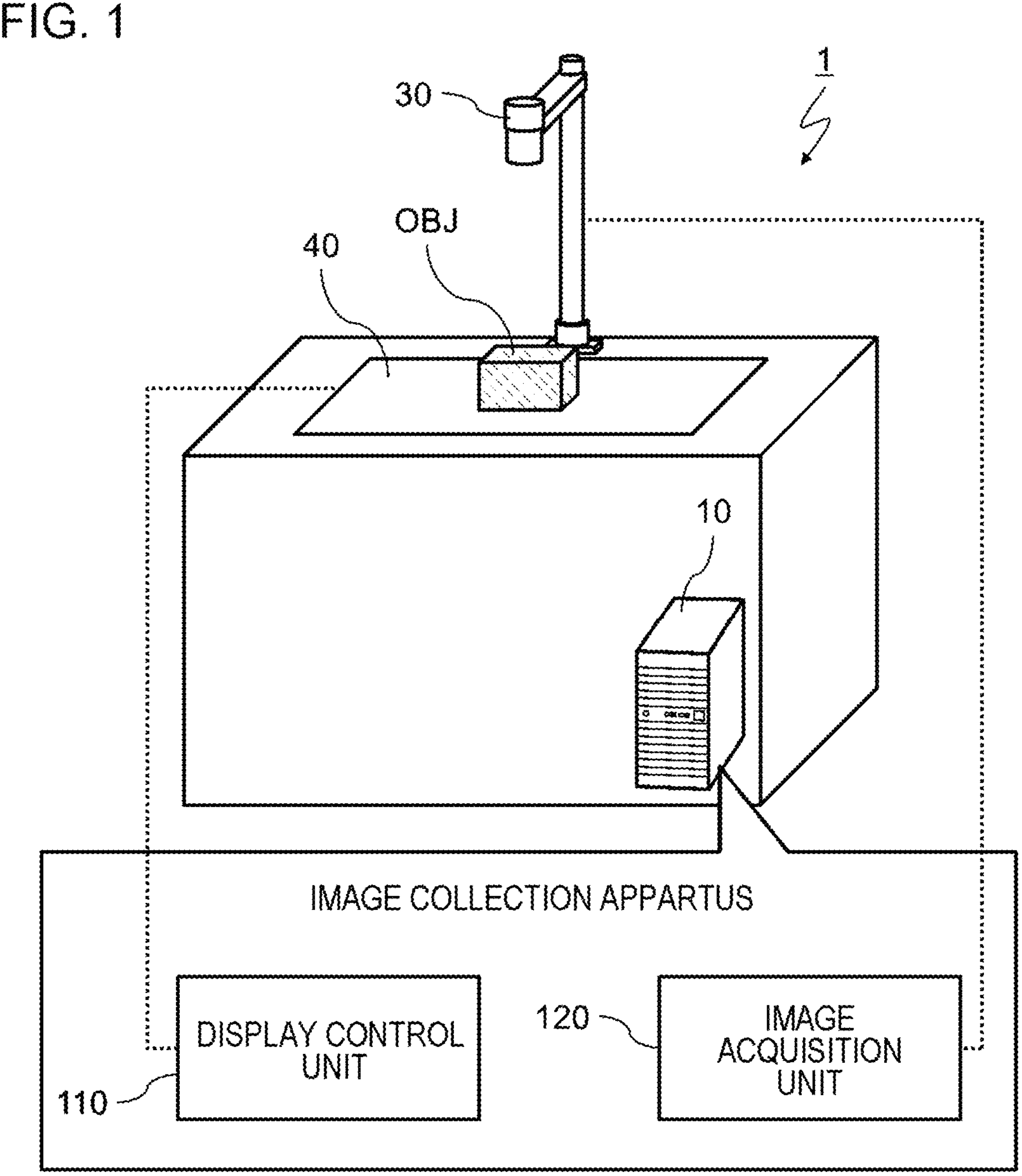
FIG. 1 is a diagram illustrating a basic configuration example of an image collection system 1 according to a first example embodiment.

Hereinafter, example embodiments of the present invention will be described by using drawings. Note that, in all of the drawings, the same component has the same reference numeral, and description thereof will not be repeated as appropriate. Further, in each block diagram, each block represents a configuration of a functional unit instead of a configuration of a hardware unit unless otherwise described.

First Example Embodiment

System Configuration Example

FIG. 1 is a diagram illustrating a basic configuration example of an image collection system 1 according to a first example embodiment. The image collection system 1 has a configuration that can efficiently generate an image usable for learning and an evaluation of a not-illustrated object identification engine (discriminator). For example, as illustrated in FIG. 1, the image collection system 1 includes an image collection apparatus 10, an image capturing apparatus 30, and a display 40. The image collection apparatus 10 is connected to the image capturing apparatus 30 and the display 40 with not-illustrated wiring and the like.

The display 40 displays various images on a display surface thereof. Further, the display 40 displays a specific image (hereinafter, expressed as a "first image") according to control by the image collection apparatus 10 described later. Further, as illustrated, the display surface of the display 40 is also used as a placement surface on which an object OBJ is placed. Note that the object OBJ is an object to be learned by the not-illustrated object identification engine. For example, the object OBJ is a product sold at a store such as a retail store.

The image capturing apparatus 30 is disposed in such a way as to include the display 40 in an image capturing range, and captures the object OBJ placed on the display surface of the display 40 and the first image displayed on the display surface.

As illustrated in FIG. 1, the image collection apparatus 10 according to the present example embodiment includes a display control unit 110 and an image acquisition unit 120. Note that, as indicated by a dotted line, the display control unit 110 and the image acquisition unit 120 communicate with the display 40 and the image capturing apparatus 30, respectively. The display control unit 110 switches and displays a plurality of images (first images) each having a different content on the display surface of the display 40 when the image capturing apparatus 30 captures the object OBJ placed on the display surface of the display 40. The image capturing apparatus 30 captures the object OBJ while the display control unit 110 switches and displays the plurality of first images on the display 40, and the image capturing apparatus 30 generates a plurality of images (hereinafter, images generated by the image capturing apparatus 30 are expressed as "second images" to be distinguished from the first images described above). In other words, the plurality of second images each include any one of the plurality of first images as a background of the object OBJ. Then, the image acquisition unit 120 acquires the plurality of second images generated in such a manner, and stores the plurality of second images in a predetermined storage apparatus. Herein, for example, the predetermined storage apparatus may be a non-volatile storage apparatus such as a hard disk drive, and may be a volatile storage apparatus such as a random access memory (RAM).

Hardware Configuration Example

The image collection system 1 may be achieved by hardware (for example, a hard-wired electronic circuit, and the like) that achieves each functional component unit, and may be achieved by a combination (for example, a combination of an electronic circuit and a program that controls the electronic circuit, and the like) of hardware and software. Hereinafter, a case where the image collection system 1 is achieved by the combination of hardware and software will be further described.

Figure 2:
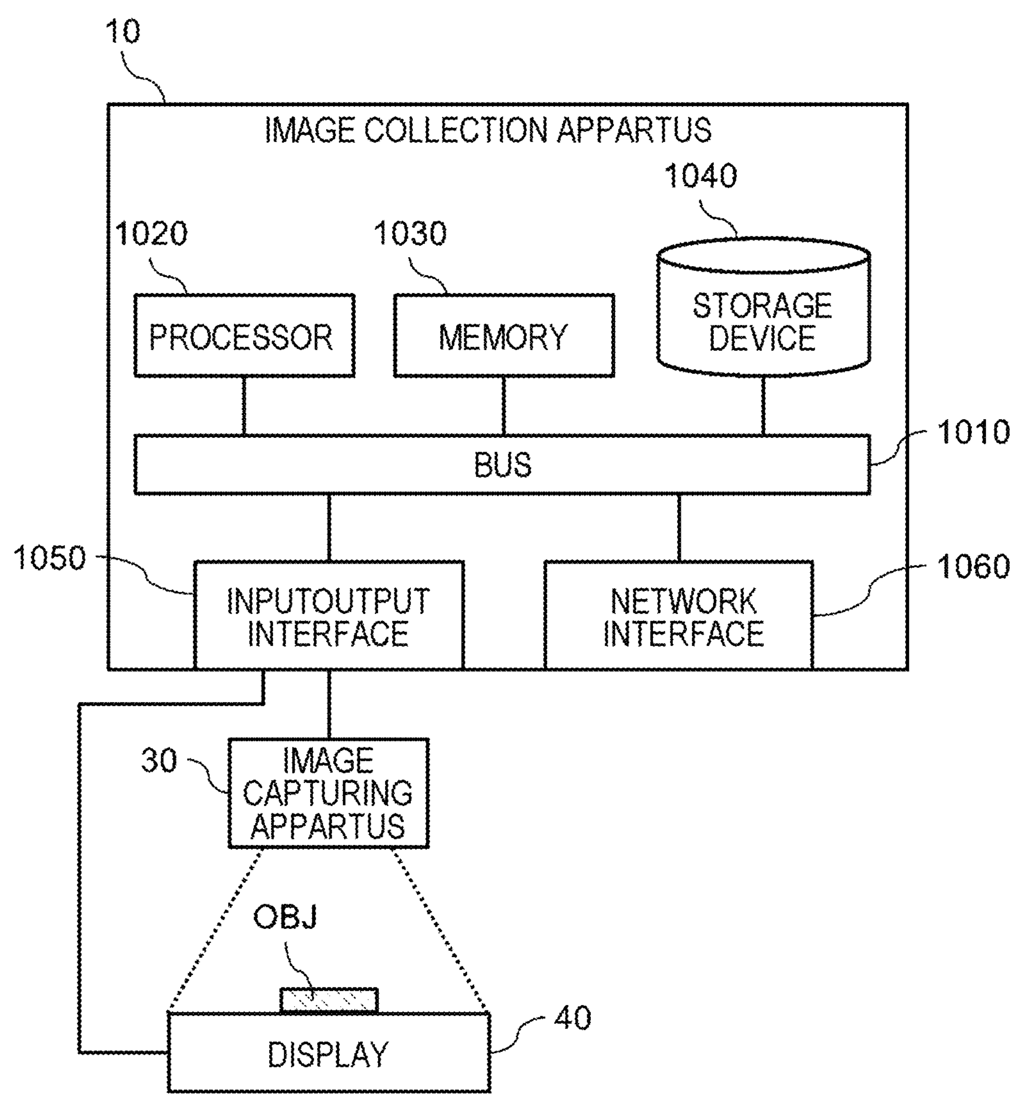
FIG. 2 is a block diagram illustrating a hardware configuration of the image collection system 1.

FIG. 2 is a block diagram illustrating a hardware configuration of the image collection system 1.

The image collection apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to a bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storage achieved by a hard disk drive (HDD), a solid state drive (SSD), a memory card, a read only memory (ROM), or the like. The storage device 1040 stores a program module that achieves each function (the display control unit 110, the image acquisition unit 120, and the like) of the image collection apparatus 10. The processor 1020 reads each program module onto the memory 1030 and executes the program module, and thereby each function associated with the program module is achieved.

The input/output interface 1050 is an interface for connecting the image collection apparatus 10 and various types of input/output devices. In FIG. 2, the image collection apparatus 10 is connected to the image capturing apparatus 30 and the display 40 via the input/output interface 1050. The image capturing apparatus 30 is a camera equipped with, for example, a charge coupled device (CCD) image sensor or a complementary metal oxide semiconductor (CMOS) image sensor. As illustrated, the image capturing apparatus 30 is installed in such a way as to include the display 40 (and the object OBJ placed on the display 40) in the image capturing range. The display 40 is a general display device. Note that the display 40 is also used as the placement surface of the object OBJ. Thus, the display 40 is preferably a flat-panel display such as a liquid crystal display (LCD), a plasma display panel (PDP), and an organic electro luminescence (EL). Further, the display 40 may be a touch panel that can receive an input operation of a user. Further, an input apparatus such as a mouse and a keyboard may be further connected to the input/output interface 1050.

The network interface 1060 is an interface for connecting the image collection apparatus 10 to a network. The network is, for example, a local area network (LAN) and a wide area network (WAN). A method of connection to the network by the network interface 1060 may be a wireless connection or a wired connection.

FIG. 2 is merely one example, and the hardware configuration of the image collection apparatus 10 is not limited to the example in FIG. 2. For example, the image collection apparatus 10 may be connected to the image capturing apparatus 30 and the display 40 via the network interface 1060. Further, another apparatus may be connected to the image collection apparatus 10. For example, when the image collection apparatus 10 is used at a retail store and the like, a work apparatus such as a bar code scanner, a cash register, a drawer, and an automatic change machine may be connected to the image collection apparatus 10.

Flow of Processing

Figure 3:
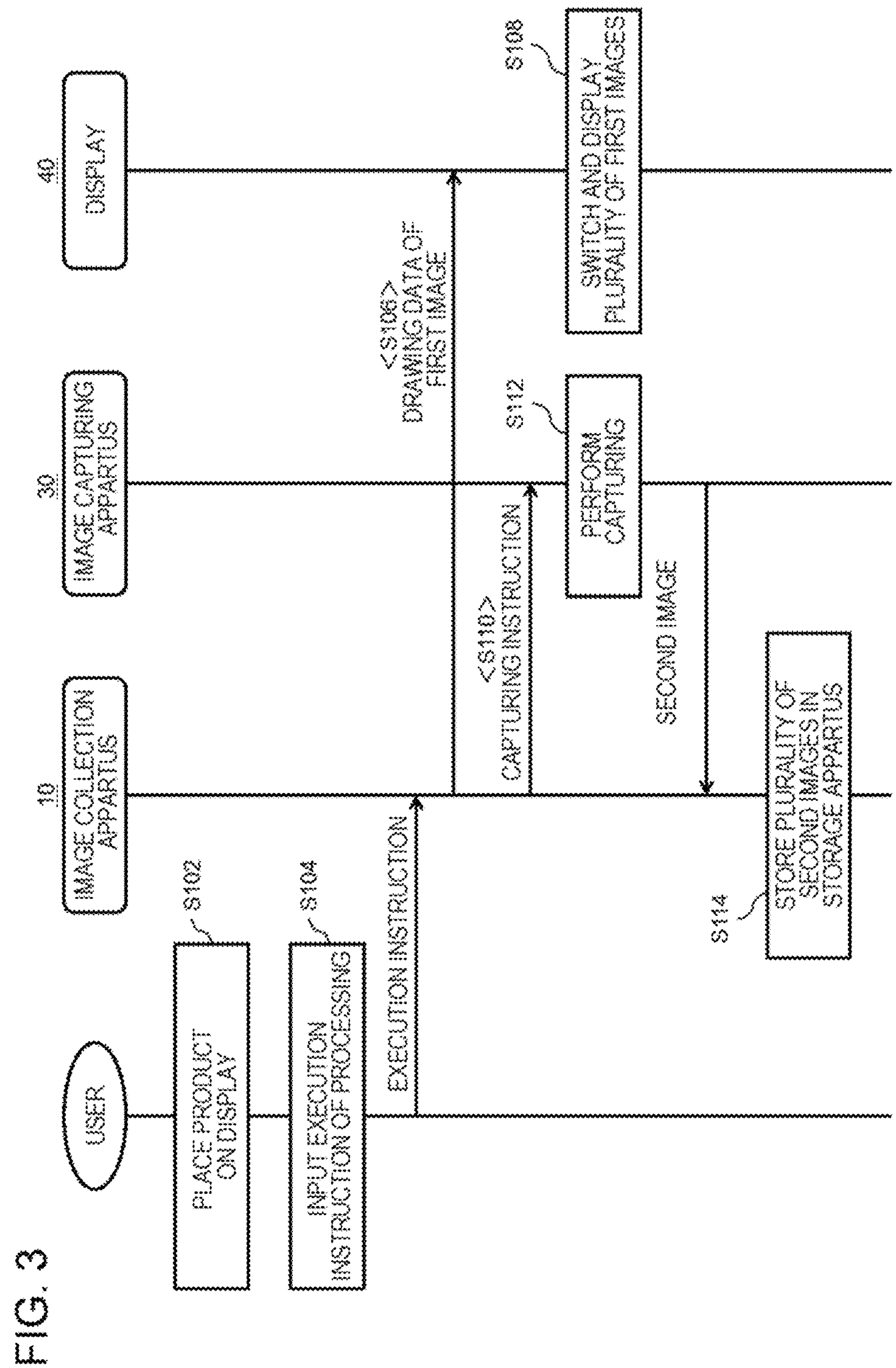
FIG. 3 is a sequence diagram illustrating a flow of processing of the image collection system 1 according to the first example embodiment.

A flow of processing executed by the image collection system 1 according to the present example embodiment will be described by using FIG. 3. FIG. 3 is a sequence diagram illustrating the flow of the processing of the image collection system 1 according to the first example embodiment. Note that the example in FIG. 3 illustrates a flow when the object OBJ is a product sold at a store such as a retail store.

First, a user who uses the image collection system 1 places a product (object OBJ) to be learned by the object identification engine on any location on the display 40 (S102). Subsequently, a user instructs execution of processing to the image collection apparatus 10, and the image collection apparatus 10 receives the instruction (S104). For example, by operating the touch panel display 40 or an input/output apparatus such as a mouse and a keyboard connected to the input/output interface 1050, a user can instruct execution of the processing to the image collection apparatus 10.

The display control unit 110 and the image acquisition unit 120 each starts an operation according to the instruction in S104.

The display control unit 110 transmits, to the display 40, drawing data causing a plurality of first images to be switched and displayed at a predetermined timing (S106). Then, the display 40 displays the plurality of first images while switching the plurality of first images, based on the drawing data received from the display control unit 110 (S108).

Figure 4:
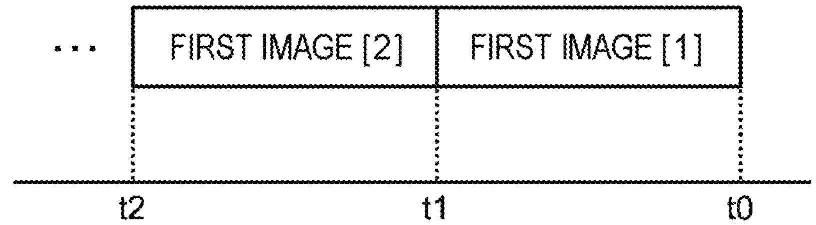
FIG. 4 is a diagram illustrating drawing data transmitted from a display control unit.

An example of the flow of the processing in S106 and S108 described above is specifically illustrated by using FIG. 4. FIG. 4 is a diagram illustrating the drawing data transmitted from the display control unit 110. In FIG. 4, t0, t1, and t2 each indicates a time. The time t0 indicates a timing of receiving data about a leading first image [1]. Further, the time t1 indicates a timing of switching to data about a first image [2] following the first image [1]. Further, the time t2 indicates a timing of switching to data about a not-illustrated first image [3] following the first image [2]. When the display 40 receives the drawing data illustrated in FIG. 4, the display 40 first displays the first image [1] from the time t0 until the time t1. Subsequently, the display 40 displays the first image [2] from the time t1 until the time t2. The display 40 also switches and displays the plurality of first images as described above according to the drawing data received from the display control unit 110 in a period after the time t2.

Herein, the plurality of first images may be images (for example, combination images each being formed of random geometrical figures, and the like) each being randomly generated. Further, the plurality of first images may be, for example, a plurality of plain images having colors different from each other. Further, the plurality of first images may be images tuned for a usage environment of the object identification engine. For example, when the object identification engine is used for identifying a product, the plurality of first images may be images having at least one of kinds and arrangements of a product different from each other. In this case, noise other than a product may be included in at least a part of the plurality of first images. Specifically, a display content such as a screen actually displayed in work at a store and a graphical user interface (GUI), a hand or a finger of a person, or the like may be included as noise in at least a part of the plurality of first images. By including such noise in the first image, a situation that may actually occur in a usage environment (specifically, a system for collectively recognizing a product to be purchased, which is placed on the display 40, with the image capturing apparatus 30 in the upper portion) of the object identification engine can be accurately reconstituted.

Data about the plurality of first images as illustrated above are stored in a storage device 1040 and the like, for example, and the display control unit 110 can read the data about each of the first images from the storage device 1040 and the like. Further, when the plurality of first images tuned for a usage environment of the object identification engine are used, the display control unit 110 may be configured to generate the plurality of first images by combining a plurality of parts images stored in the storage device 1040 randomly or according to a predetermined rule.

Referring back to FIG. 3, while the first image is switched and displayed on the display 40, the image acquisition unit 120 transmits a capturing instruction to the image capturing apparatus 30 in accordance with the timing of switching the first image (S110). For example, when the drawing data as illustrated in FIG. 4 are transmitted, the image acquisition unit 120 transmits the capturing instruction to the image capturing apparatus 30 at least once in each of periods from the time t0 until the time t1 and from the time t1 until the time t2. Then, the image capturing apparatus 30 performs a capturing operation according to the capturing instruction from the image acquisition unit 120, and generates a plurality of second images (S112). According to the example in FIG. 4, a second image [1] in which a product (object OBJ) is captured with the first image [1] in the background and a second image [2] in which the same product (the same object OBJ) is captured with the first image [2] in the background are generated. Then, the image acquisition unit 120 communicates with the image capturing apparatus 30, acquires the plurality of second images generated in S112, and stores the plurality of second images in a predetermined storage apparatus such as the memory 1030 and the storage device 1040 (S114).

As described above, in the image collection system 1 according to the present example embodiment, the plurality of first images each having a different content are switched and displayed on the display surface of the display 40 when the object OBJ placed on the display 40 is captured. Then, the plurality of second images including the object OBJ and any one of the plurality of first images are generated by the image capturing apparatus 30 that includes the display 40 in the image capturing range, and are stored in the predetermined storage apparatus.

According to the configuration described above, it is possible to easily generate an image of the object OBJ in various situations without manually preparing a photographing set depending on various situations. For example, by switching and displaying, on the display 40, an image of a situation that may actually occur when image recognition is performed, an image looking as if an object other than the object OBJ and other display elements are present on the display surface of the display 40 can be easily generated. The plurality of second images generated in such a manner can be used as images for optimization (learning or an evaluation) of the discriminator that identifies the object OBJ. In other words, the image collection system 1 according to the present example embodiment can easily generate various images as images for optimizing the object identification engine. That is, since efficiency of generating an image for optimizing the discriminator improves, time and effort when the discriminator used in object recognition is constructed can be reduced.

Second Example Embodiment

The present example embodiment is similar to the first example embodiment except for the following point.

System Configuration Example

Figure 5:
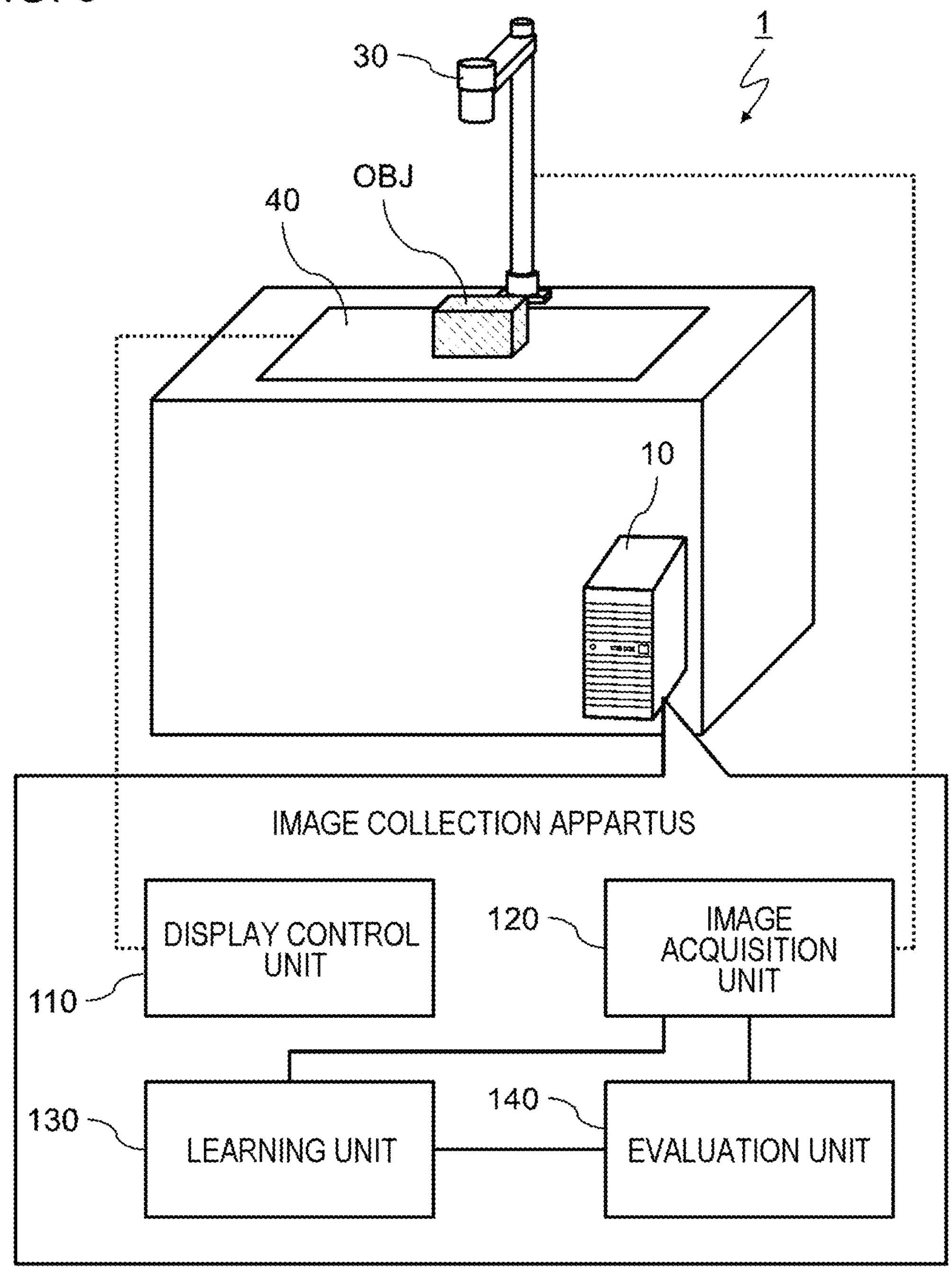
FIG. 5 is a diagram illustrating a configuration example of an image collection system 1 according to a second example embodiment.

FIG. 5 is a diagram illustrating a configuration example of an image collection system 1 according to a second example embodiment. According to the present example embodiment, an image collection apparatus 10 further includes a learning unit 130 and an evaluation unit 140. The learning unit 130 generates or updates an object identification engine (discriminator) by using a plurality of second images acquired by an image acquisition unit 120. The evaluation unit 140 evaluates identification accuracy of the object identification engine (discriminator) by using the plurality of second images acquired by the image acquisition unit 120.

Hardware Configuration Example

The image collection system 1 according to the present example embodiment has a hardware configuration (for example: FIG. 2) similar to that in the first example embodiment. A storage device 1040 according to the present example embodiment further stores a program module that achieves functions of the learning unit 130 and the evaluation unit 140 described above. A processor 1020 reads the program module onto a memory 1030 and executes the program module, and thus the functions of the learning unit 130 and the evaluation unit 140 according to the present example embodiment are achieved.

Flow of Processing

Figure 6:
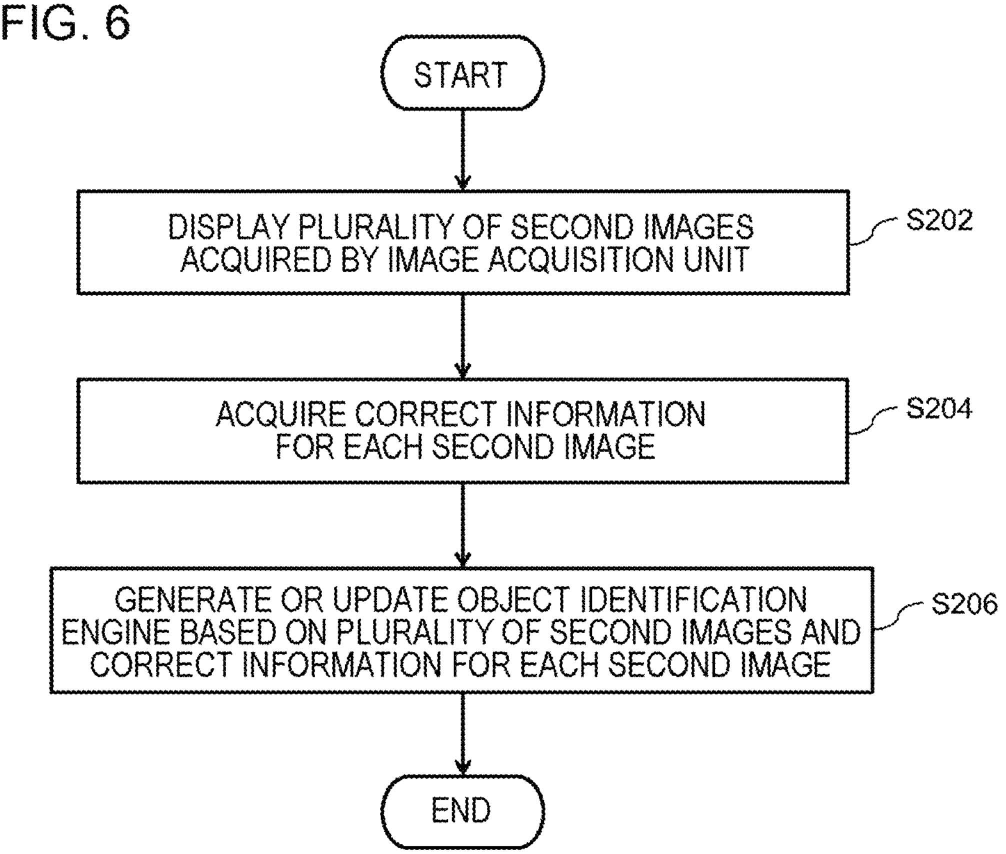
FIG. 6 is a flowchart illustrating a flow of learning processing executed by the image collection system 1 according to the second example embodiment.
Figure 7:
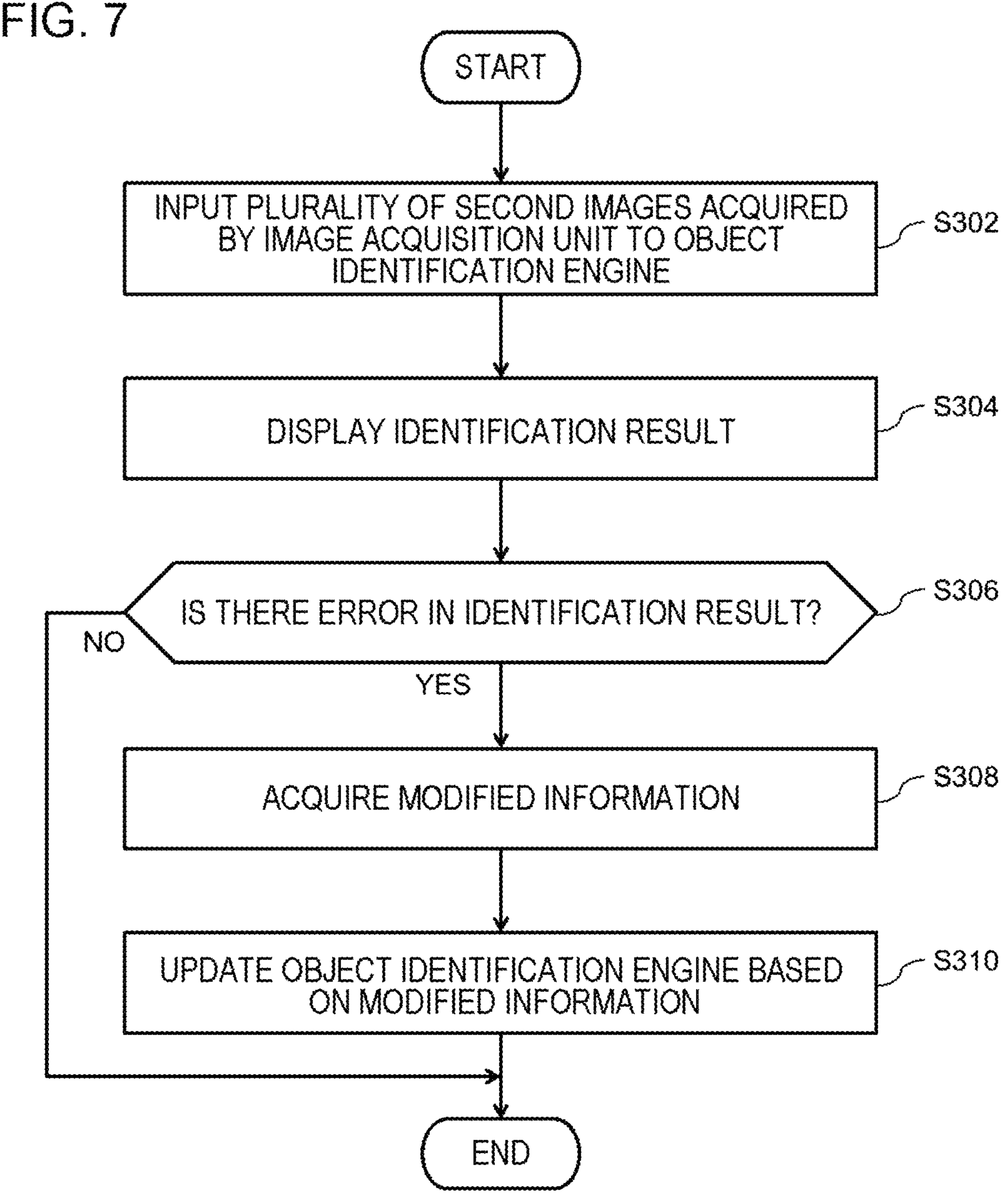
FIG. 7 is a flowchart illustrating a flow of evaluation processing executed by the image collection system 1 according to the second example embodiment.

A flow of processing executed by the image collection system 1 according to the present example embodiment will be described by using FIGS. 6 and 7. FIG. 6 is a flowchart illustrating a flow of learning processing executed by the image collection system 1 according to the second example embodiment. Further, FIG. 7 is a flowchart illustrating a flow of evaluation processing executed by the image collection system 1 according to the second example embodiment.

Learning Processing

First, the flow of the learning processing will be described by using FIG. 6.

The learning unit 130 displays the plurality of second images acquired by the image acquisition unit 120 in S114 in FIG. 3 on the display 40, a not-illustrated separate monitor, or the like (S202). Then, a user who uses the image collection system 1 confirms the second image displayed on the display 40 or the not-illustrated separate monitor, and inputs information (for example, an object name, identification information about an object, and the like) indicating what the object OBJ is and information indicating a region of the object OBJ. Note that, hereinafter, a combination of the information (for example, an object name, identification information about an object, and the like) indicating what the object OBJ is and the information indicating a region of the object OBJ is referred to as “correct information”. Then, the learning unit 130 acquires the correct information for each of the second images input by a user (S204). Then, the learning unit 130 generates or updates the object identification engine, based on each of the plurality of second images and the correct information for each of the second images being acquired in the processing in S204 (S206). In a state where the object identification engine is not yet generated, the learning unit 130 generates an object recognition parameter of the object identification engine, based on each of the plurality of second images and the correct information for each of the second images being acquired in the processing in S204. The generated object identification engine is stored in the storage device 1040 and the like, for example. Further, when the object identification engine has been generated, the learning unit 130 updates an object recognition parameter of the object identification engine, based on each of the plurality of second images and the correct information for each of the second images being acquired in the processing in S204.

In this way, according to the present example embodiment, the object identification engine can be easily generated and updated by using the plurality of second images generated in the first example embodiment.

Evaluation Processing

Next, the flow of the evaluation processing will be described by using FIG. 7. The evaluation processing is executed when an object identification engine to be evaluated is already prepared.

The evaluation unit 140 inputs the plurality of second images acquired by the image acquisition unit 120 in S114 in FIG. 3 to the object identification engine to be evaluated (S302). Then, the evaluation unit 140 displays an identification result of the object identification engine to be evaluated on, for example, the display 40, a not-illustrated separate monitor, or the like (S304). Then, a user who uses the image collection system 1 confirms the identification result displayed on the display 40 or the not-illustrated separate monitor, and confirms whether there is an error in the identification result of the plurality of second images (S306). When there is no error in the identification result (S306: NO), subsequent processing is not executed. On the other hand, when there is an error in the identification result (S306: YES), a user inputs accurate correct information (modified information) related to the second image having the error in the identification result. The evaluation unit 140 acquires the modified information input by a user (S308), and transmits the modified information to the learning unit 130. The learning unit 130 updates a parameter of the object identification engine, based on the modified information (S310).

In this way, according to the present example embodiment, identification accuracy of the object identification engine can be evaluated by using the plurality of second images generated in the first example embodiment. Further, identification accuracy of the object identification engine can be improved by receiving an input of modified information when there is an error in an identification result of the object identification engine.

Third Example Embodiment

According to the present example embodiment, a system capable of efficiently generating an image usable for learning and an evaluation of an object identification engine by a method different from that of the image collection system 1 in each of the example embodiments described above will be described.

System Configuration Example

Figure 8:
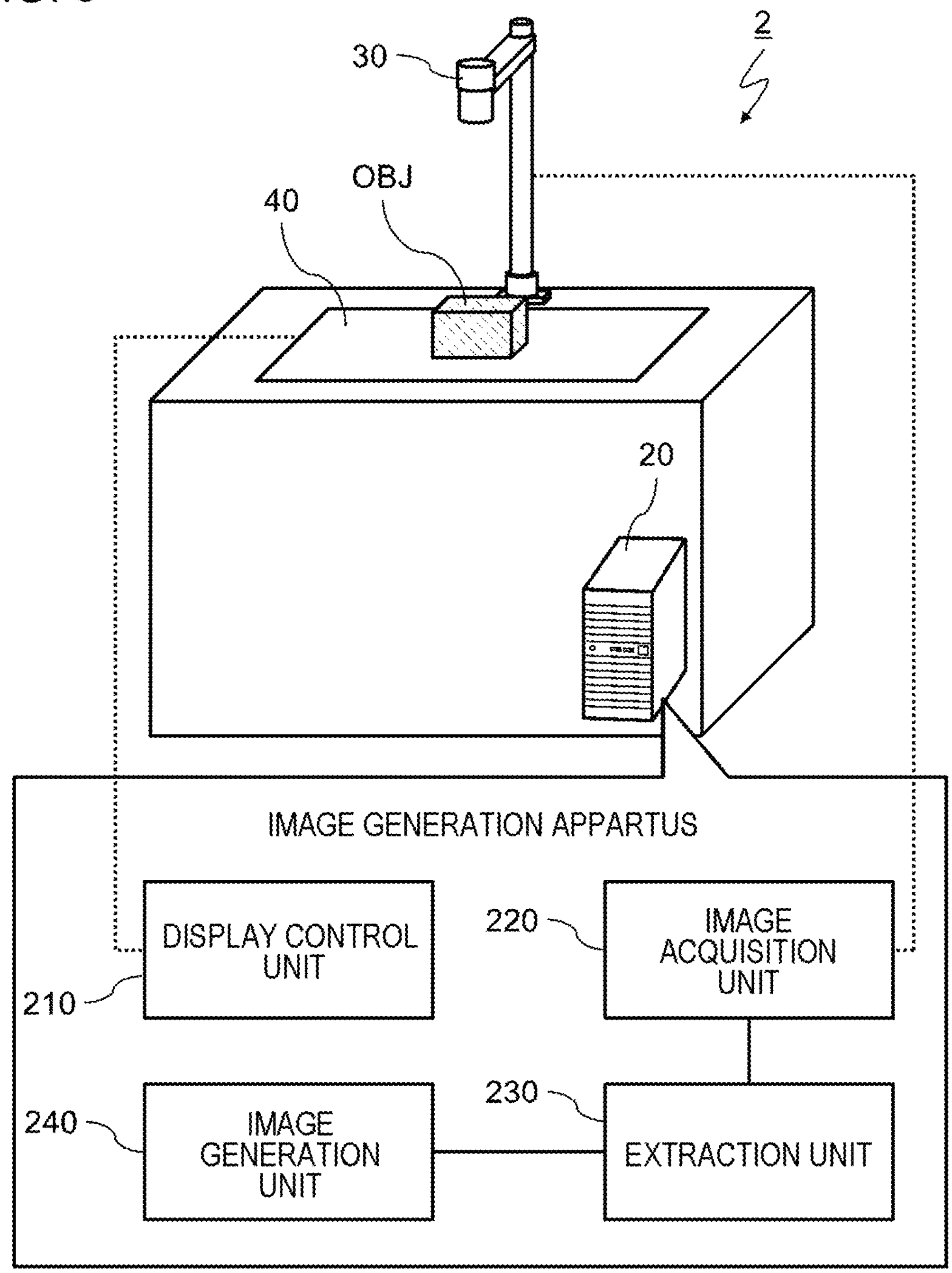
FIG. 8 is a diagram illustrating a basic configuration example of an image generation system 2.

FIG. 8 is a diagram illustrating a basic configuration example of an image generation system 2. As illustrated in FIG. 8, the image generation system 2 includes an image generation apparatus 20, an image capturing apparatus 30, and a display 40. The image generation apparatus 20 is connected to the image capturing apparatus 30 and the display 40 with not-illustrated wiring and the like. Note that description of the image capturing apparatus 30 and the display 40 is similar to that thereof in the image collection system 1 described above and will be omitted.

As illustrated in FIG. 8, the image generation apparatus 20 according to the present example embodiment includes a display control unit 210, an image acquisition unit 220, an extraction unit 230, and an image generation unit 240. Note that, as indicated by a dotted line, the display control unit 210 and the image acquisition unit 220 communicate with the display 40 and the image capturing apparatus 30, respectively. The display control unit 210 displays a predetermined first image on a display surface of the display 40 when the image capturing apparatus 30 captures an object OBJ placed on the display surface of the display 40. The display control unit 210 may display one specific kind of first image on the display surface of the display 40, or may switch and display a plurality of first images each having a different content on the display surface of the display 40 similarly to the first example embodiment. The image capturing apparatus 30 captures the object OBJ while the image acquisition unit 220 displays the first image on the display 40, and the image capturing apparatus 30 generates a second image. Then, the image acquisition unit 220 acquires the second image generated by the image capturing apparatus 30. The extraction unit 230 extracts a partial image (hereinafter, expressed as an "object region image") indicating a region of the object OBJ from the second image. Note that a specific example of an operation of the extraction unit 230 will be described later. The image generation unit 240 generates a new image (hereinafter, expressed as a "third image") by combining the object region image extracted by the extraction unit 230 with a background image, and stores the third image in a predetermined storage apparatus. Herein, for example, the predetermined storage apparatus may be a non-volatile storage apparatus such as a hard disk drive, and may be a volatile storage apparatus such as a random access memory (RAM).

Hardware Configuration Example

The image generation system 2 may be achieved by hardware (for example, a hard-wired electronic circuit, and the like) that achieves each functional component unit, and may be achieved by a combination (for example, a combination of an electronic circuit and a program that controls the electronic circuit, and the like) of hardware and software. Hereinafter, a case where the image generation system 2 is achieved by the combination of hardware and software will be further described.

Figure 9:
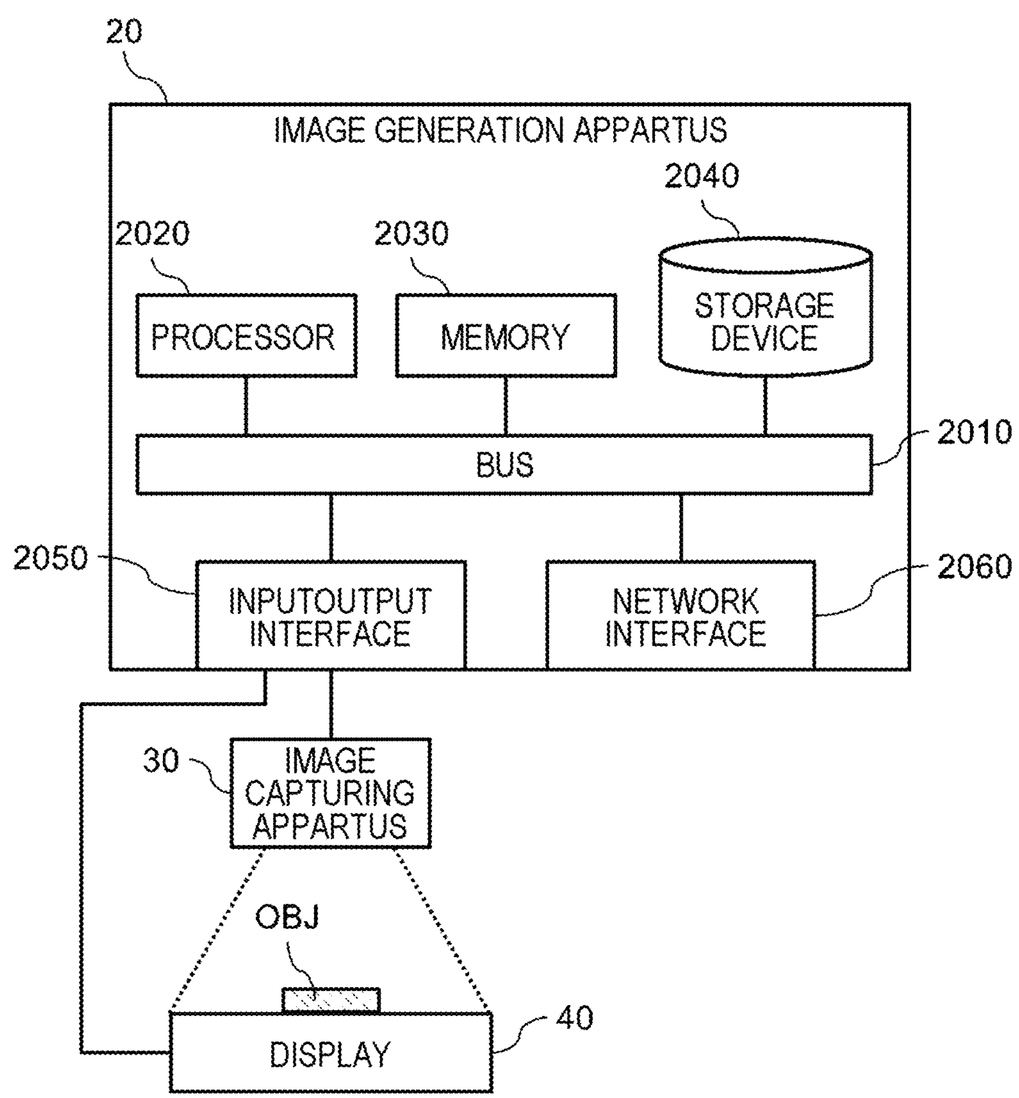
FIG. 9 is a block diagram illustrating a hardware configuration of the image generation system 2.

FIG. 9 is a block diagram illustrating a hardware configuration of the image generation system 2.

The image generation apparatus 20 includes a bus 2010, a processor 2020, a memory 2030, a storage device 2040, an input/output interface 2050, and a network interface 2060.

The bus 2010 is a data transmission path for allowing the processor 2020, the memory 2030, the storage device 2040, the input/output interface 2050, and the network interface 2060 to transmit and receive data with one another. However, a method of connecting the processor 2020 and the like to each other is not limited to a bus connection.

The processor 2020 is a processor achieved by a central processing unit (CPU), a graphics processing unit (GPU), and the like.

The memory 2030 is a main storage achieved by a random access memory (RAM) and the like.

The storage device 2040 is an auxiliary storage achieved by a hard disk drive (HDD), a solid state drive (SSD), a memory card, a read only memory (ROM), or the like. The storage device 2040 stores a program module that achieves each function (the display control unit 210, the image acquisition unit 220, the extraction unit 230, the image generation unit 240, and the like) of the image generation apparatus 20. The processor 2020 reads each program module onto the memory 2030 and executes the program module, and thereby each function associated with the program module is achieved.

The input/output interface 2050 is an interface for connecting the image generation apparatus 20 and various types of input/output devices. In FIG. 9, the image generation apparatus 20 is connected to the image capturing apparatus 30 and the display 40 via the input/output interface 2050. The image capturing apparatus 30 is a camera equipped with, for example, a charge coupled device (CCD) image sensor or a complementary metal oxide semiconductor (CMOS) image sensor. As illustrated, the image capturing apparatus 30 is installed in such a way as to include the display 40 (and the object OBJ placed on the display 40) in the image capturing range. The display 40 is a general display device. Note that the display 40 is also used as a placement surface of the object OBJ. Thus, the display 40 is preferably a flat-panel display such as a liquid crystal display (LCD), a plasma display panel (PDP), and an organic electro luminescence (EL). Further, the display 40 may be a touch panel that can receive an input operation of a user. Further, an input apparatus such as a mouse and a keyboard may be further connected to the input/output interface 2050.

The network interface 2060 is an interface for connecting the image generation apparatus 20 to a network. The network is, for example, a local area network (LAN) and a wide area network (WAN). A method of connection to the network by the network interface 2060 may be a wireless connection or a wired connection.

FIG. 9 is merely one example, and the hardware configuration of the image generation apparatus 20 is not limited to the example in FIG. 9. For example, the image generation apparatus 20 may be connected to the image capturing apparatus 30 and the display 40 via the network interface 2060. Further, another apparatus may be connected to the image generation apparatus 20. For example, when the image generation apparatus 20 is used at a retail store and the like, a work apparatus such as a bar code scanner, a cash register, a drawer, and an automatic change machine may be connected to the image generation apparatus 20.

Flow of Processing

A flow of processing executed by the image generation system 2 according to the present example embodiment will be described by using FIG. 10. FIG. 10 is a sequence diagram illustrating the flow of the processing of the image generation system 2 according to the third example embodiment. Note that the example in FIG. 10 illustrates a flow when the object OBJ is a product sold at a store such as a retail store.

First, a user who uses the image generation system 2 places a product (object OBJ) to be learned by the object identification engine on any location on the display 40 (S402). Subsequently, a user instructs execution of processing to the image generation apparatus 20, and the image generation apparatus 20 receives the instruction (S404). For example, by operating the touch panel display 40 or an input/output apparatus such as a mouse and a keyboard connected to the input/output interface 2050, a user can instruct execution of the processing to the image generation apparatus 20.

The display control unit 210 and the image acquisition unit 220 each starts an operation according to the instruction in S404.

The display control unit 210 transmits, to the display 40, drawing data of a predetermined first image (S406). The drawing data of the predetermined first image are stored in the storage device 2040 and the like, for example, and the display control unit 210 can read the drawing data of the predetermined first image from the storage device 2040 and the like. Then, the display 40 displays the first image, based on the drawing data received from the display control unit 210 (S408).

While the first image is displayed on the display 40, the image acquisition unit 220 transmits a capturing instruction to the image capturing apparatus 30 (S410). Then, the image capturing apparatus 30 performs a capturing operation according to the capturing instruction from the image acquisition unit 220, and generates a second image in which the product (object OBJ) is captured with the predetermined first image in the background (S412). Then, the image acquisition unit 220 communicates with the image capturing apparatus 30, and acquires the second image generated in S412.

Then, the extraction unit 230 extracts an object region image indicating a region of the product (object OBJ) from the second image (S414). Hereinafter, various specific techniques of extracting an object region image from a second image will be illustrated by using drawings.

First Technique

Figure 11:
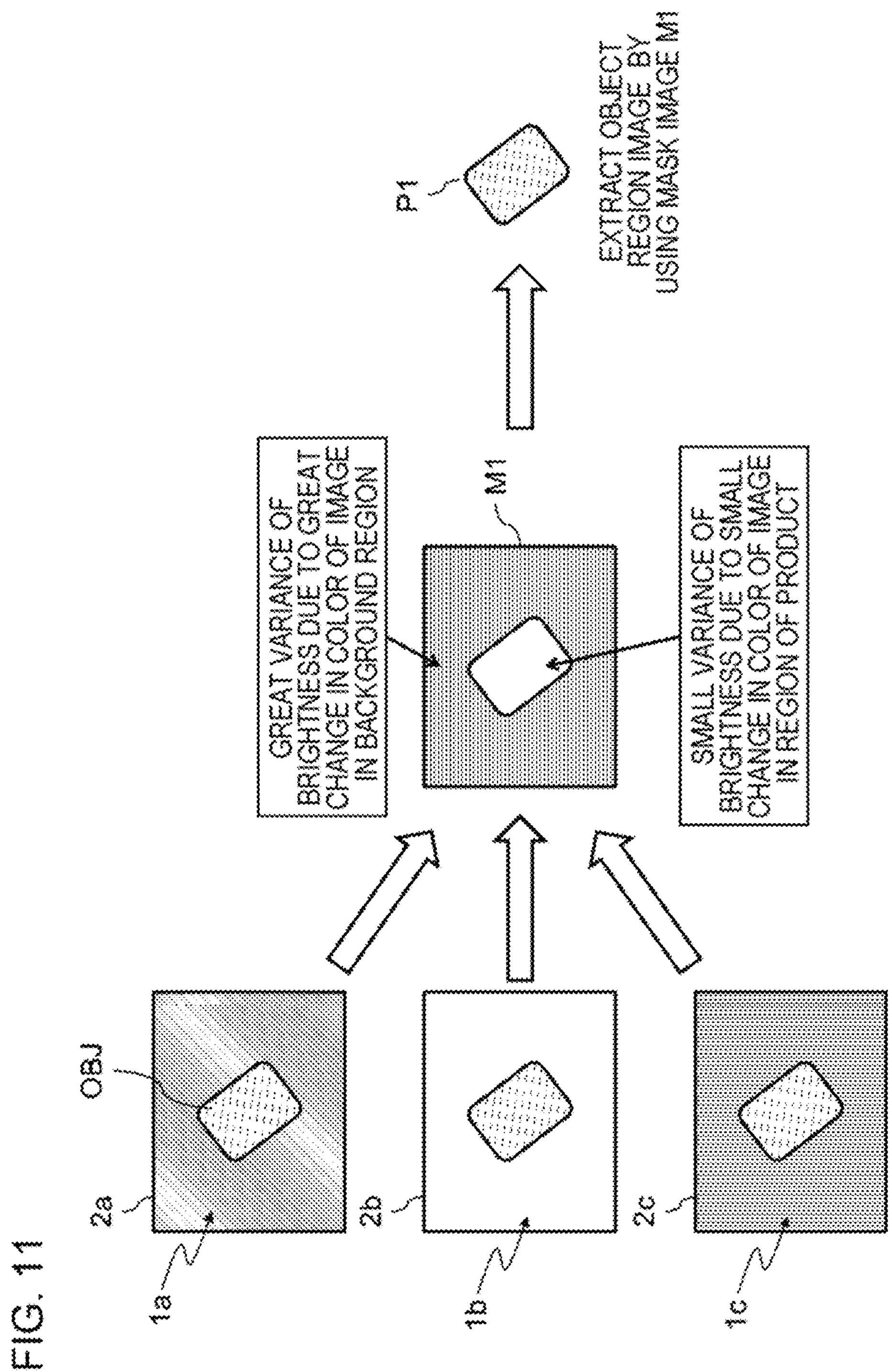
FIG. 11 is a diagram illustrating a first technique of extracting an object region image from a second image.

FIG. 11 is a diagram illustrating a first technique of extracting an object region image from a second image. In the technique in FIG. 11, the display control unit 210 displays, on the display 40, plain images having colors different from each other as a plurality of first images having contents different from each other. FIG. 11 illustrates an example of using three first images (la to 1*c*) respectively having red (hatched portion in the diagram), white (plain portion in the diagram), and blue (vertical line portion in the diagram) as ground colors. The images are stored in the storage device 2040, for example. Note that FIG. 11 is merely exemplification, and a combination of colors of the first images and the number of colors are not limited to the example in FIG. 11. In this case, the image acquisition unit 220 can acquire a second image (2*a*) in which a product (object OBJ) is captured with the red first image (la) in the background, a second image (2*b*) in which the product is captured with the white first image (1*b*) in the background, and a second image (2*c*) in which the product is captured with the blue first image (1*c*) in the background. Herein, the product (object OBJ) is placed on the display surface of the display 40. Thus, when the three second images (2*a* to 2*c*)

are compared, a change in color of the region in which the product is placed is clearly smaller than a change in color of the display surface of the display 40. In other words, when the plurality of second images are each compared, a change amount of brightness of the region in which the product is placed is clearly smaller than a change amount of brightness of the other region (namely, the display surface of the display 40). Thus, the extraction unit 230 can extract an object region image by using the change amount of brightness among the plurality of second images. Specifically, the extraction unit 230 first calculates a variance of brightness for each pixel of each of the three second images (2*a* to 2*c*). Next, the extraction unit 230 determines, by using a predetermined threshold value, each of a set region (background region) of pixels having a variance of brightness exceeding the threshold value among the three second images (2*a* to 2*c*), and a set region (foreground region, namely, a region of a product) of pixels having a change amount of brightness being less than the threshold value. The predetermined threshold value is defined in a program module of the extraction unit 230, for example. Next, the extraction unit 230 generates a mask image M1 that masks the background region, by using a result of the determination as described above. Then, the extraction unit 230 extracts an object region image P1 indicating a region of the product (object OBJ) from the second image, by using the generated mask image M1. The extraction unit 230 stores, in the storage device 2040, the other storage apparatus, or the like, the generated mask image M1 and the extracted object region image P1 of the product (object OBJ) in association with information (for example, a product name, a product identification number, and the like) that identifies the product (object OBJ).

Second Technique

Figure 12:
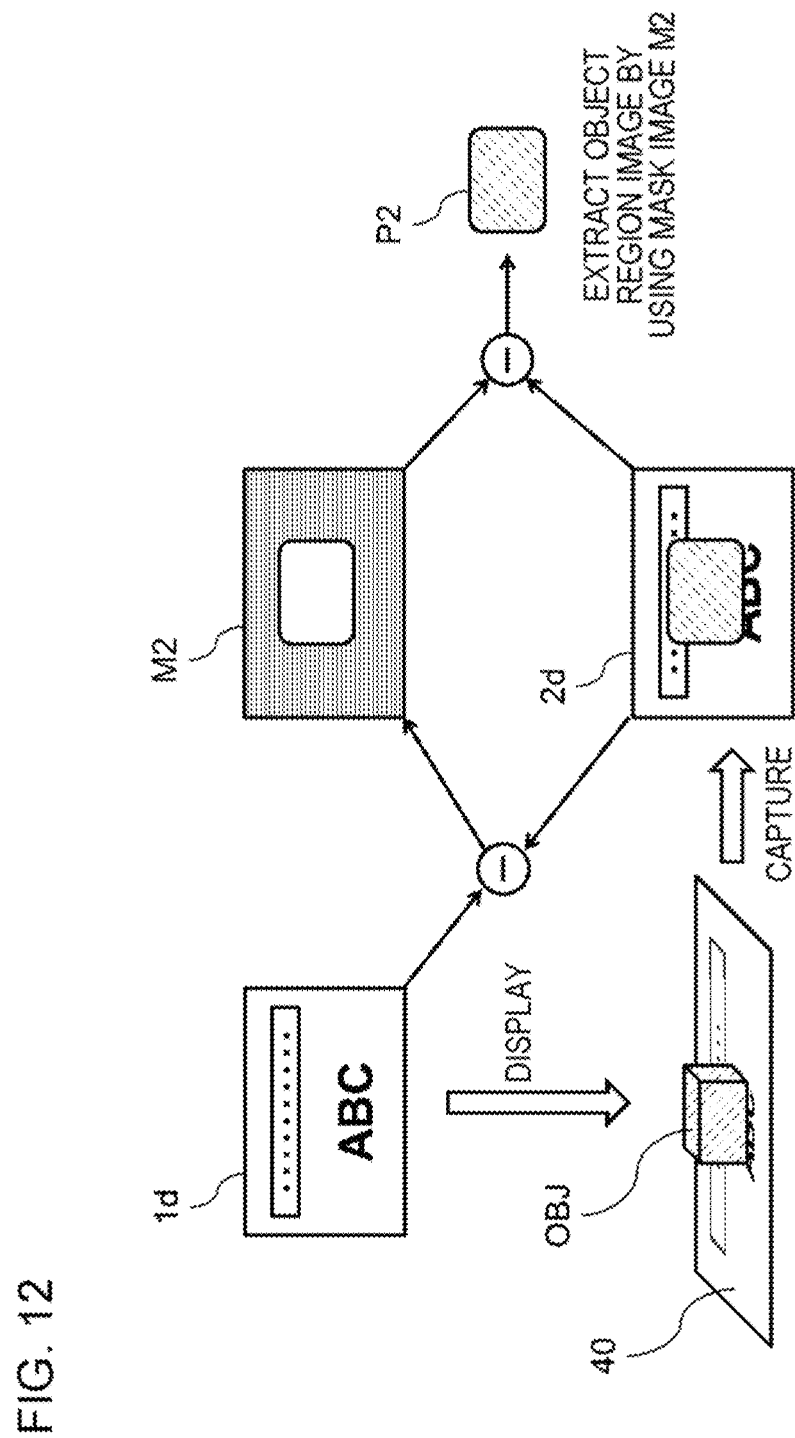
FIG. 12 is a diagram illustrating a second technique of extracting an object region image from a second image.

FIG. 12 is a diagram illustrating a second technique of extracting an object region image from a second image. In the technique in FIG. 12, the display control unit 210 displays, on the display 40, a known background image (1*d*) as a predetermined first image. The known background image (1*d*) is stored in the storage device 2040, for example. The image capturing apparatus 30 captures an image after a product (object OBJ) is placed on the display 40 that displays the known background image (1*d*), and then the image acquisition unit 220 can acquire a second image (2*d*) as illustrated. Herein, the product (object OBJ) is placed on the display surface of the display 40. Thus, a partial region of the known background image (1*d*) is hidden by the product (object OBJ) in the second image (2*d*). In other words, the extraction unit 230 can determine, as a region of the product, a set region of pixels of the second image (2*d*) different from the known background image (1*d*). Further, the extraction unit 230 can determine, as a background region, a set region of pixels of the second image (2*d*) equal to the known background image (1*d*). Then, the extraction unit 230 generates a mask image M2 that masks the background region, by using a result of the determination as described above. Then, the extraction unit 230 extracts an object region image P2 indicating a region of the product (object OBJ) from the second image, by using the generated mask image M2. The extraction unit 230 stores, in the storage device 2040, the other storage apparatus, or the like, the generated mask image M2 and the extracted object region image P2 of the product (object OBJ) in association with information (for example, a product name, a product identification number, and the like) that identifies the product (object OBJ).

The second technique unlike the first technique uses a displacement of a pattern of a known image and the like, and determines a region of the product (object OBJ). Thus, even when a product placed on the display 40 is a transparent object (for example, a drink in a plastic bottle and the like), a region of the product (object OBJ) can be accurately determined. Note that the extraction unit 230 may use a plurality of known images in the second technique. In this case, the extraction unit 230 can determine a region of the product (object OBJ), based on a result acquired by determining a set region of pixels different for each of the plurality of known images.

Third Technique

Figure 13:
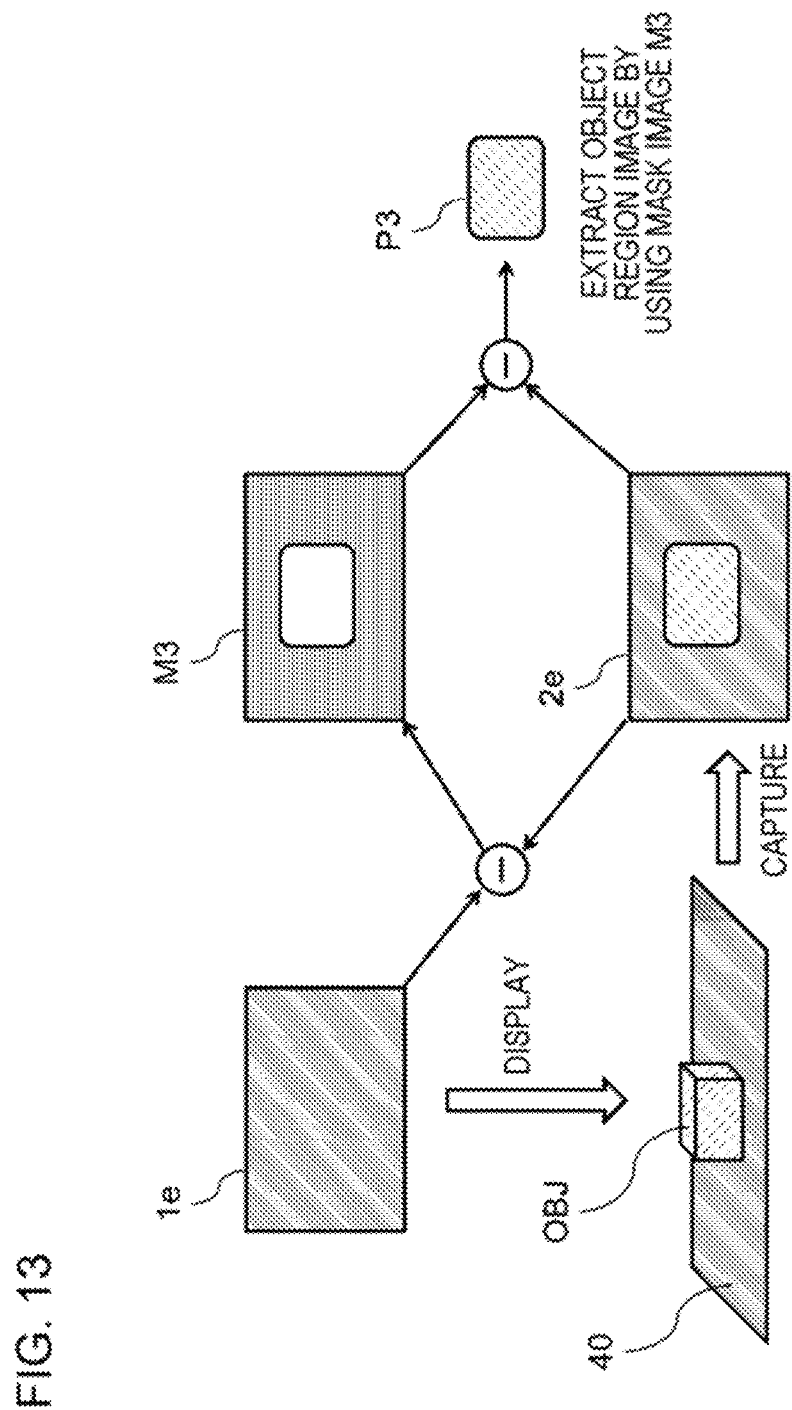
FIG. 13 is a diagram illustrating a third technique of extracting an object region image from a second image.

FIG. 13 is a diagram illustrating a third technique of extracting an object region image from a second image. In the technique in FIG. 13, the display control unit 210 displays, on the display 40, a known background image (1*e*) as a predetermined first image. Note that the third technique is different from the second technique in a point that a plain image is used as a known background image. The known background image (1*e*) is stored in the storage device 2040, for example. The image capturing apparatus 30 captures an image after a product (object OBJ) is placed on the display 40 that displays the known background image (1*e*), and then the image acquisition unit 220 can acquire a second image (2*e*) as illustrated. Herein, the product (object OBJ) is placed on the display surface of the display 40. Thus, a partial region of the known background image (1*e*) is hidden by the product (object OBJ) in the second image (2*e*). Furthermore, since the known background image (1*e*) is plain, the extraction unit 230 can determine, as a region of the product, a set region of pixels of the second image (2*e*) having a color different from that of the known background image (1*e*). Further, the extraction unit 230 can determine, as a background region, a set region of pixels of the second image (2*e*) having the same color as that of the known background image (1*e*). Then, the extraction unit 230 generates a mask image M3 that masks the background region, by using a result of the determination as described above. Then, the extraction unit 230 extracts an object region image P3 indicating a region of the product (object OBJ) from the second image, by using the generated mask image M3. The extraction unit 230 stores, in the storage device 2040, the other storage apparatus, or the like, the generated mask image M3 and the extracted object region image P3 of the product (object OBJ) in association with information (for example, a product name, a product identification number, and the like) that identifies the product (object OBJ).

The third technique extracts a region of the product (object OBJ), based on a color of a background image. Thus, the third technique unlike the first technique of using a variance of brightness can also handle a translucent product.

Figure 14:
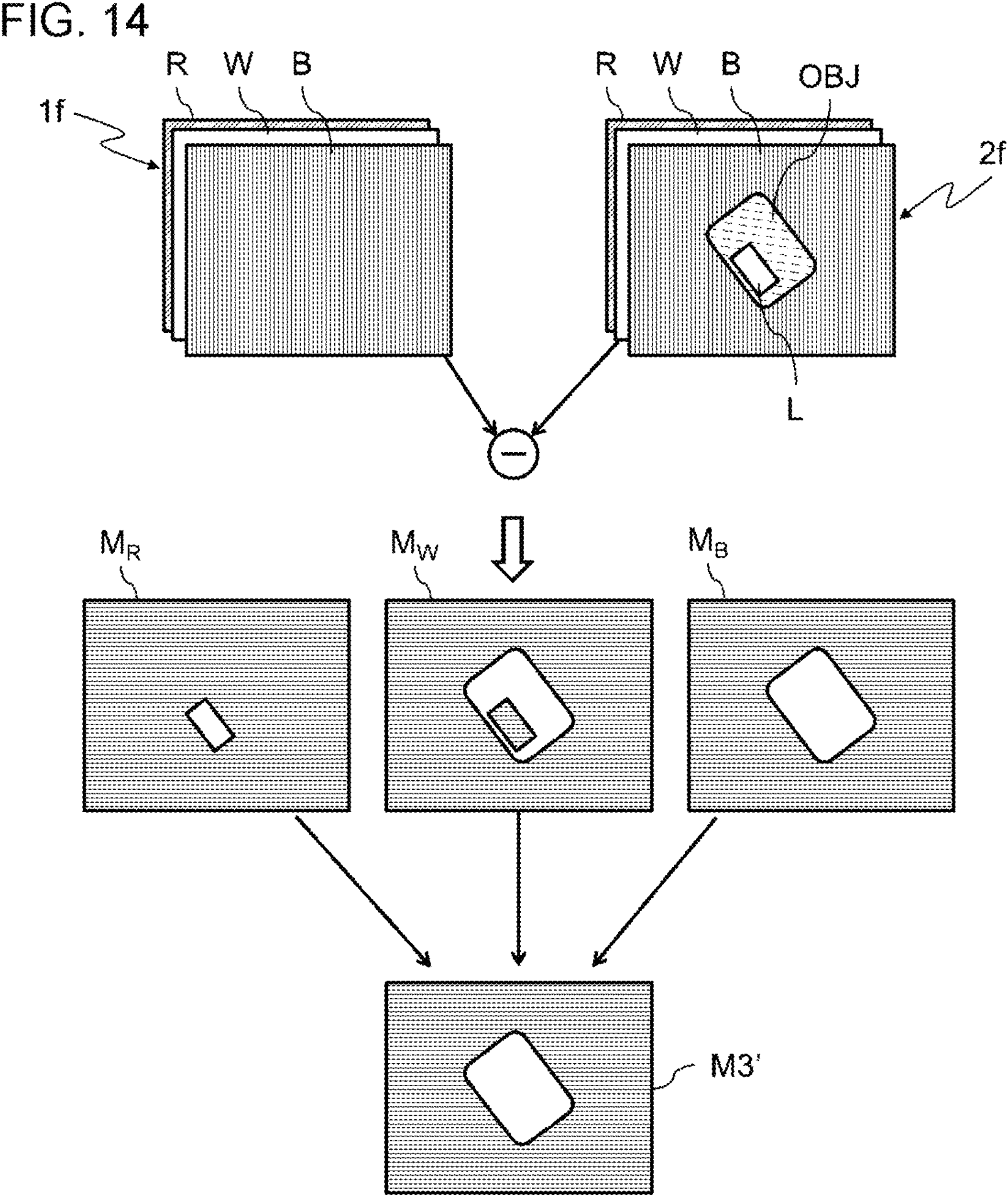
FIG. 14 is a diagram illustrating another example of the third technique of extracting an object region image from a second image.

Note that known background images may be a plurality of images each having a different color in the third technique (for example: FIG. 14). FIG. 14 is a diagram illustrating another example of the third technique. FIG. 14 illustrates known three background images (10 respectively having red (hatched portion R in the diagram), white (plain portion W in the diagram), and blue (vertical line portion B in the diagram). Note that it is assumed that a color of a package of the product (object OBJ) is red and a white label L is stuck on the product (object OBJ) in the example in FIG. 14. In this case, the extraction unit 230 can generate mask images (color-specific mask images $M_R$, $M_W$, and $M_B$) for red, white, and blue similarly to the flow described in FIG. 13. The color-specific mask image $M_R$ is an image that masks a red region. Further, the color-specific mask image $M_W$ is an image that masks a white region. Further, the color-specific mask image $M_B$ is an image that masks a blue region. As illustrated, the color-specific mask image $M_R$ includes a package portion (a red region except for a region of the white label L) of the product in the mask region. Further, the color-specific mask image $M_W$ includes the region of the white label L stuck on the product in the mask region. In such a case, the extraction unit 230 can generate a final mask image M3' from an AND operation of the mask regions of the color-specific mask images $M_R$, $M_W$, and $M_B$, for example. Then, the extraction unit 230 can extract an object region image indicating a region of the product (object OBJ) from the second image, by using the generated mask image M3'. In this way, for example, even when a color of at least a part of a product is coincidentally the same as a color of a background image, a mask image that accurately extracts a region of the product can be generated.

Fourth Technique

Figure 15:
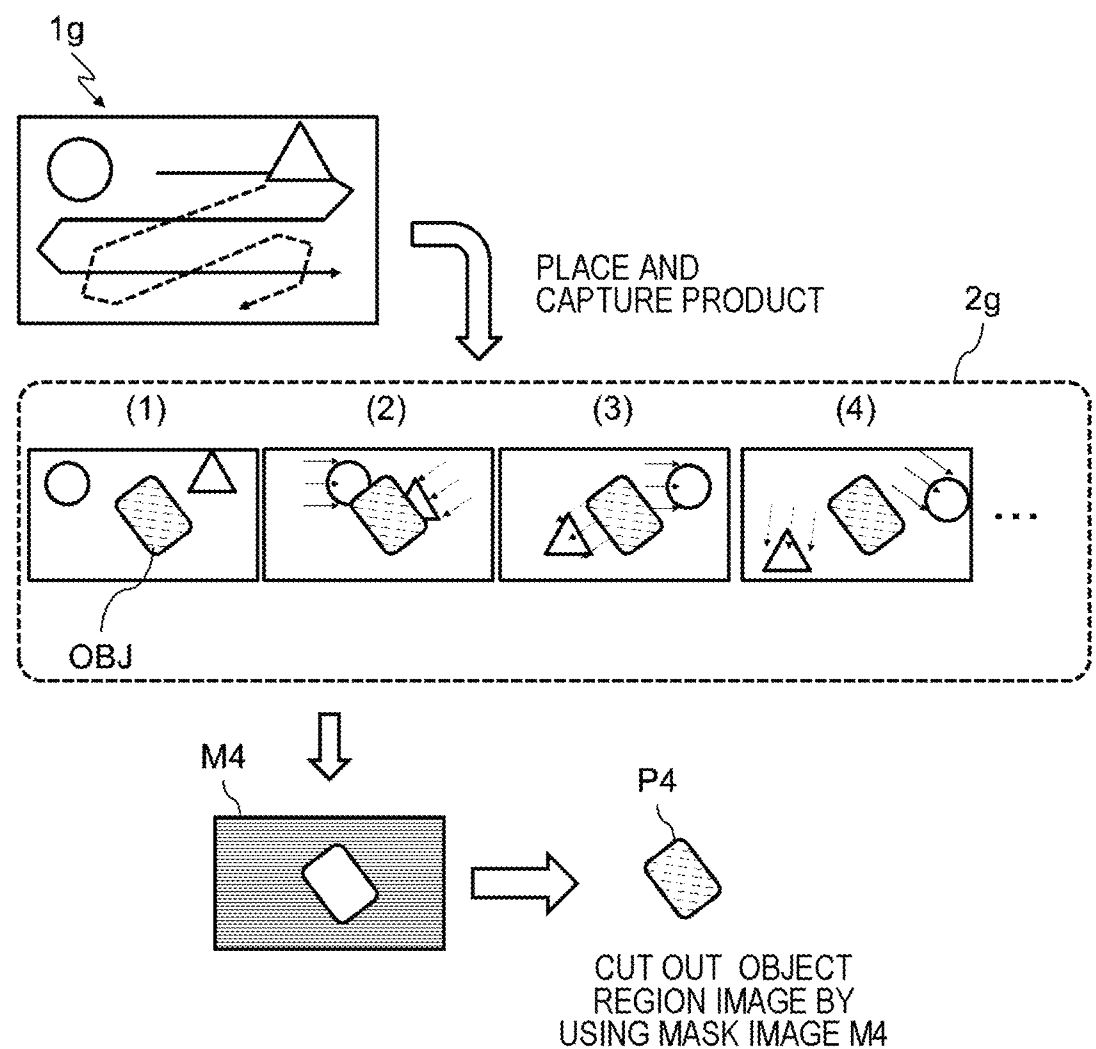
FIG. 15 is a diagram illustrating a fourth technique of extracting an object region image from a second image.

FIG. 15 is a diagram illustrating a fourth technique of extracting an object region image from a second image. In the technique in FIG. 15, the display control unit 210 displays, on the display 40, a moving image (1*g*) as a predetermined first image. Note that FIG. 15 illustrates the moving image (1*g*) in which two figures (circle and triangle) move with time. Note that the display control unit 210 can display any moving image, which is not limited to the example in FIG. 15. In this case, the image acquisition unit 220 can acquire a plurality of second images as indicated by a reference sign 2*g* in FIG. 15, for example. Herein, a product (object OBJ) is placed on the display surface of the display 40. Thus, at least a part of the figure moving in the moving image (1*g*) may be hidden by the product (object OBJ) in the second image (2*g*) (for example: 2*g* (2)). In other words, a movement is smaller in a region in which the product (object OBJ) is placed than in a moving image portion in the background in the plurality of second images. Thus, the extraction unit 230 can determine, as a region of the product, a set region (a region of an object remaining still) of pixels having a small movement in the plurality of second images. Specifically, the extraction unit 230 can determine a region of the product by using an optical flow, a background difference, and the like. Further, the extraction unit 230 can determine, as a background region, a set region of pixels of having a certain movement or more. Then, the extraction unit 230 generates a mask image M4 that masks the background region, by using a result of the determination as described above. Then, the extraction unit 230 extracts an object region image P4 indicating a region of the product (object OBJ) from the second image, by using the generated mask image M4. The extraction unit 230 stores, in the storage device 2040, the other storage apparatus, or the like, the generated mask image M4 and the extracted object region image P4 of the product (object OBJ) in association with information (for example, a product name, a product identification number, and the like) that identifies the product (object OBJ).

Note that, when a plurality of objects are simultaneously placed on the display 40 in each of the techniques described above, the extraction unit 230 can store, for each individual object, a mask image and an object region image of the object in the storage apparatus as follows. Specifically, the extraction unit 230 first divides an acquired mask image into individual regions by a connection component analysis and the like, and generates a mask image for each object. Then, the extraction unit 230 stores, in the storage apparatus, the mask image for each object and an object region image of the object extracted by the mask image in association with information that identifies the object.

Further, the extraction unit 230 may store, in the storage apparatus, a second image acquired by the image acquisition unit 220 instead of the object region image. Also, in this case, an object region image of an object as a target can be generated as necessary by using the second image and a mask image stored in the storage apparatus.

Referring back to FIG. 10, the image generation unit 240 generates a new image (third image) by combining the object region image extracted in the processing in S414 with a background image (S416). Note that the image generation unit 240 may generate a third image by using an object region image of another object extracted in past processing in addition to the object region image extracted in the processing in S414. The object region image of the another object extracted in the past processing is accumulated in the storage device 2040, for example. In this case, the image generation unit 240 can select an object region image to be read from the storage device 2040 according to a selection input of a user or a preset rule. Further, the image generation unit 240 may randomly select a kind and the number of object region images to be combined.

Figure 16:
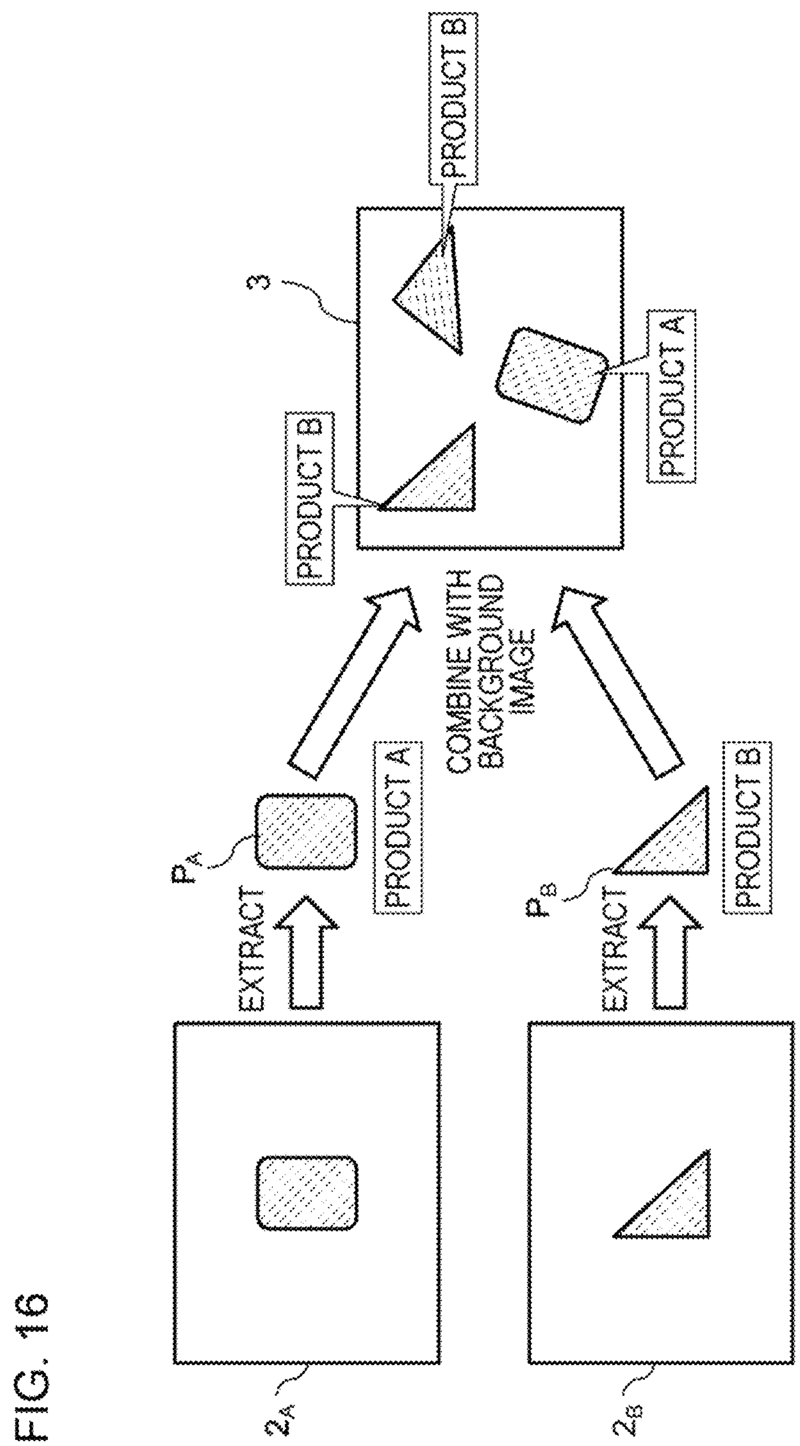
FIG. 16 is a diagram specifically illustrating an operation of an image generation unit.

An operation of the image generation unit 240 will be specifically described by using FIG. 16. FIG. 16 is a diagram specifically illustrating the operation of the image generation unit 240. In the example in FIG. 16, it is assumed that an object region image PA of a product A and an object region image PB of a product B are generated from second images 2A and 2B of two objects (product A and product B), respectively. In this case, the image generation unit 240 can generate a third image as indicated by a reference sign 3, for example, by combining the object region image PA of the product A and the object region image PB of the product B with a background image. As illustrated, the image generation unit 240 can process (rotate, move, and the like) the object region image PA of the product A and the object region image PB of the product B. Further, the image generation unit 240 can determine the number of arrangements of the object region image PA of the product A and the object region image PB of the product B. The image generation unit 240 can determine a way of processing and the number of arrangements according to a specification input of a user or a predetermined rule, or completely randomly. Further, the image generation unit 240 generates a list of object region images combined with a background image during generation of a third image. For example, the list stores, for each object region image combined with the background image, positional coordinates in the background image and information indicating a product, such as a name of an object and an identification number. In other words, the list can be used as information indicating which object is present in which position in the third image.

The image generation unit 240 stores the third image generated as described above in a predetermined storage apparatus such as the memory 2030 and the storage device 2040 (S418). At this time, the image generation unit 240 stores the third image and the list in association with each other. In this way, the image generation unit 240 according to the present example embodiment can generate a numerous number of images according to various situations, by using an object region image.

As described above, in the image generation system 2 according to the present example embodiment, a second image including the object OBJ and a first image is generated by displaying the first image on the display surface of the display 40 when the object OBJ placed on the display 40 is captured. Then, based on a characteristic generated in the second image by the object OBJ being placed on the display 40 that displays the first image, an object region image indicating a region of the object OBJ is extracted from the second image. Then, a third image is generated by combining the extracted object region image with a background image.

The image generation system 2 according to the present example embodiment can easily generate a third image having a numerous number of patterns as an image for learning or an evaluation of an object identification engine (discriminator), by using the extracted object region image. In other words, the image generation system 2 according to the present example embodiment improves efficiency of generating an image for optimizing the discriminator, and can thus reduce time and effort when the discriminator used in object recognition is constructed.

Fourth Example Embodiment

The present example embodiment is similar to the third example embodiment except for the following point.

System Configuration Example

Figure 17:
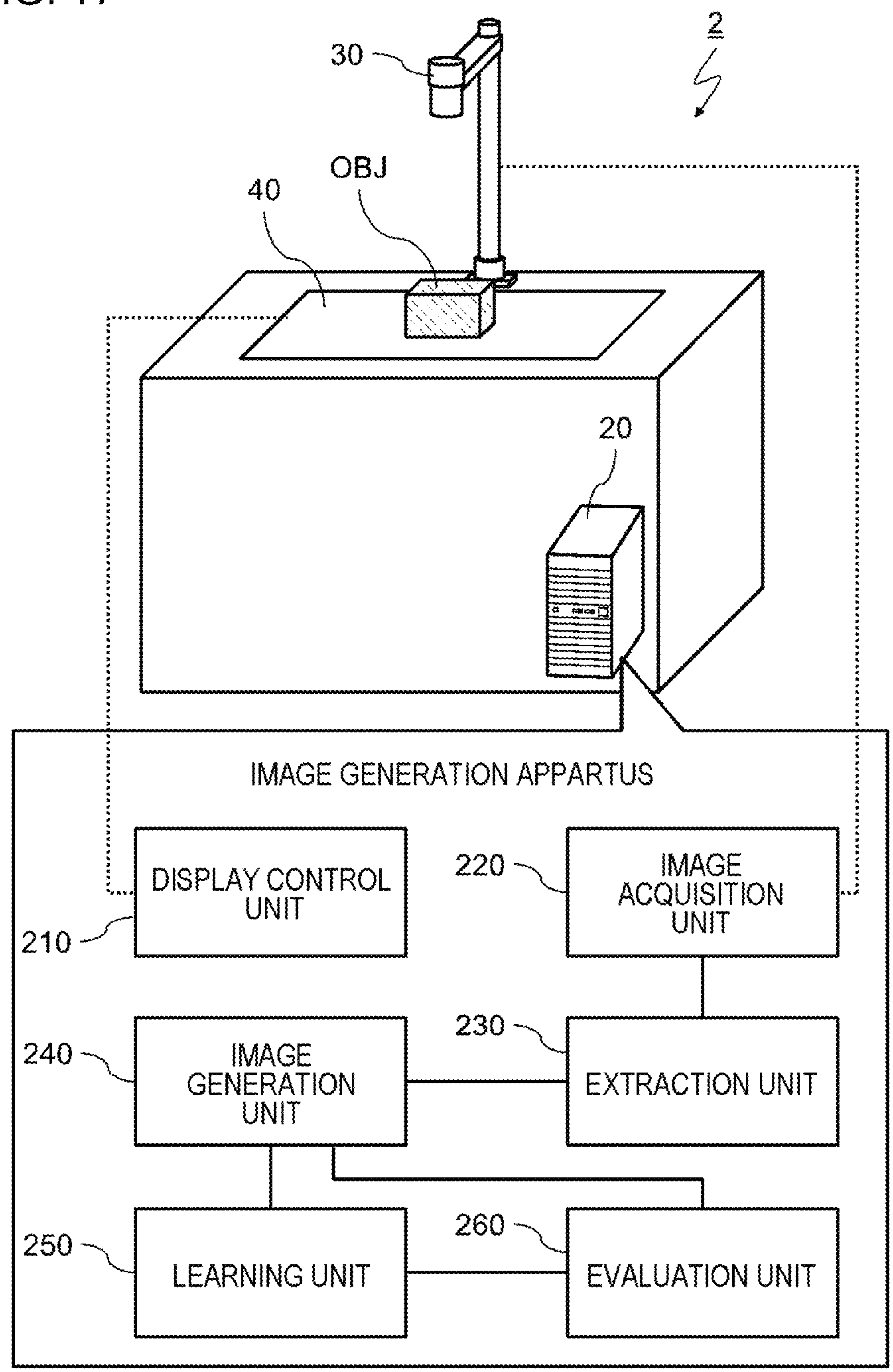
FIG. 17 is a diagram illustrating a configuration example of an image generation system 2 according to a fourth example embodiment.

FIG. 17 is a diagram illustrating a configuration example of an image generation system 2 according to a fourth example embodiment. According to the present example embodiment, an image generation apparatus 20 further includes a learning unit 250 and an evaluation unit 260. The learning unit 250 generates or updates an object identification engine (discriminator) by using a third image generated by an image generation unit 240. The evaluation unit 260 evaluates identification accuracy of the object identification engine (discriminator) by using the third image generated by the image generation unit 240.

Hardware Configuration Example

The image generation system 2 according to the present example embodiment has a hardware configuration (for example: FIG. 9) similar to that in the third example embodiment. A storage device 2040 according to the present example embodiment further stores a program module that achieves functions of the learning unit 250 and the evaluation unit 260 described above. A processor 2020 reads the program module onto a memory 2030 and executes the program module, and thus the functions of the learning unit 250 and the evaluation unit 260 according to the present example embodiment are achieved.

Flow of Processing

The learning unit 250 and the evaluation unit 260 according to the present example embodiment operate similarly to the learning unit 130 and the evaluation unit 140 according to the second example embodiment except for a point that the third image generated by the image generation unit 240 is used (for example: FIGS. 6 and 7).

As described above, according to the present example embodiment, identification accuracy of the object identification engine can be evaluated by using the third image generated in the third example embodiment. Further, identification accuracy of the object identification engine can be improved by receiving an input of modified information when there is an error in an identification result of the object identification engine.

While the example embodiments of the present invention have been described with reference to the drawings, the example embodiments are only exemplification of the present invention, and various configurations other than the above-described example embodiments can also be employed.

Further, the plurality of steps (processing) are described in order in the plurality of sequence diagrams and flowcharts used in the above-described description, but an execution order of steps performed in each of the example embodiments is not limited to the described order. In each of the example embodiments, an order of illustrated steps may be changed within an extent that there is not harm in context. Further, each of the example embodiments described above can be combined within an extent that a content is not inconsistent.

1.

An image collection apparatus, including:

a display control unit that switches and displays a plurality of first images each having a different content on a display surface of a display when an object placed on the display surface of the display is captured; and an image acquisition unit that acquires a plurality of second images being generated by capturing the object on the display surface of the display while the plurality of first images are switched and displayed, and stores the plurality of second images in a storage apparatus.

2.

The image collection apparatus according to supplementary note 1, wherein the image acquisition unit acquires the plurality of second images as images for learning or an evaluation of a discriminator that identifies the object.

3.

The image collection apparatus according to supplementary note 2, further including a learning unit that generates or updates the discriminator by using the plurality of second images.

4.

The image collection apparatus according to supplementary note 2 or 3, further including an evaluation unit that evaluates identification accuracy of the discriminator by using the plurality of second images.

5.

The image collection apparatus according to any one of supplementary notes 1 to 4, wherein the object is a product.

6.

The image collection apparatus according to any one of supplementary notes 1 to 5, wherein the display control unit displays plain images having colors different from each other as the plurality of first images.

7.

An image collection system, including:

a display including a display surface being used as a placement surface of an object;

an image capturing apparatus that captures an object placed on the display surface of the display;

a display control unit that switches and displays a plurality of first images each having a different content on the display surface of the display when the object is photographed; and an image acquisition unit that acquires a plurality of second images being generated by capturing the object on the display surface of the display while the plurality of first images are switched and displayed, and stores the plurality of second images in a storage apparatus.

8.

The image collection system according to supplementary note 7, wherein the image acquisition unit acquires the plurality of second images as images for learning or an evaluation of a discriminator that identifies the object.

9.

The image collection system according to supplementary note 8, further including a learning unit that generates or updates the discriminator by using the plurality of second images.

10.

The image collection system according to supplementary note 8 or 9, further including an evaluation unit that evaluates identification accuracy of the discriminator by using the plurality of second images.

11.

The image collection system according to any one of supplementary notes 7 to 10, wherein the object is a product.

12.

The image collection system according to any one of supplementary notes 7 to 11, wherein the display control unit displays plain images having colors different from each other as the plurality of first images.

13.

An image collection method executed by a computer including:

switching and displaying a plurality of first images each having a different content on a display surface of a display when an object placed on the display surface of the display is captured; and acquiring a plurality of second images being generated by capturing the object on the display surface of the display while the plurality of first images are switched and displayed, and storing the plurality of second images in a storage apparatus.

14.

The image collection method executed by the computer according to supplementary note 13, further including acquiring the plurality of second images as images for learning or an evaluation of a discriminator that identifies the object.

15.

The image collection method executed by the computer according to supplementary note 14, further including generating or updating the discriminator by using the plurality of second images.

16.

The image collection method executed by the computer according to supplementary note 14 or 15, further including evaluating identification accuracy of the discriminator by using the plurality of second images.

17.

The image collection method executed by the computer according to any one of supplementary notes 13 to 16, wherein the object is a product.

18.

The image collection method executed by the computer according to any one of supplementary notes 13 to 17, further including displaying plain images having colors different from each other as the plurality of first images.

19.

A program causing a computer to execute the image collection method according to any one of supplementary notes 13 to 18.

20.

An image generation apparatus, including:

a display control unit that displays a predetermined first image on a display surface of a display when an object placed on the display surface of the display is captured;

an image acquisition unit that acquires a second image being generated by capturing the object on the display surface of the display while the first image is displayed;

an extraction unit that extracts an object region image indicating a region of the object from the second image; and an image generation unit that generates a third image by combining the object region image with a background image, and stores the third image in a storage apparatus.

21.

The image generation apparatus according to supplementary note 20, wherein the image generation unit generates the third image as an image for learning or an evaluation of a discriminator that identifies the object.

22.

The image generation apparatus according to supplementary note 21, further including a learning unit generates or updates the discriminator by using an image for the learning or the evaluation.

23.

The image generation apparatus according to supplementary note 21 or 22, further including an evaluation unit that evaluates identification accuracy of the discriminator by using an image for the learning or the evaluation.

24.

The image generation apparatus according to any one of supplementary notes 20 to 23, wherein the object is a product.

25.

The image generation apparatus according to any one of supplementary notes 20 to 24, wherein the display control unit switches and displays a plurality of first images each having a different content on the display surface of the display.

26.

The image generation apparatus according to supplementary note 25, wherein the display control unit displays plain images having colors different from each other as the plurality of first images.

27.

The image generation apparatus according to supplementary note 25, wherein the display control unit displays a moving image as the plurality of first images.

28.

An image generation system, including:

a display including a display surface being used as a placement surface of an object;

an image capturing apparatus that captures an object placed on the display surface of the display;

a display control unit that displays a predetermined first image on a display surface of the display when the object is captured;

an image acquisition unit that acquires a second image being generated by capturing the object on the display surface of the display while the first image is displayed;

an extraction unit that extracts an object region image indicating a region of the object from the second image; and an image generation unit that generates a third image by combining the object region image with a background image, and stores the third image in a storage apparatus.

29.

The image generation system according to supplementary note 28, wherein the image generation unit generates the third image as an image for learning or an evaluation of a discriminator that identifies the object.

30.

The image generation system according to supplementary note 29, further including a learning unit that generates or updates the discriminator by using an image for the learning or the evaluation.

31.

The image generation system according to supplementary note 29 or 30, further including an evaluation unit that evaluates identification accuracy of the discriminator by using an image for the learning or the evaluation.

32.

The image generation system according to any one of supplementary notes 28 to 31, wherein the object is a product.

33.

The image generation system according to any one of supplementary notes 28 to 32, wherein the display control unit switches and displays a plurality of first images each having a different content on the display surface of the display.

34.

The image generation system according to supplementary note 33, wherein the display control unit displays plain images having colors different from each other as the plurality of first images.

35.

The image generation system according to supplementary note 33, wherein the display control unit displays a moving image as the plurality of first images.

36.

An image generation method executed by the computer, including: displaying a predetermined first image on a display surface of a display when an object placed on the display surface of the display is captured;

acquiring a second image being generated by capturing the object on the display surface of the display while the first image is displayed;

extracting an object region image indicating a region of the object from the second image; and generating a third image by combining the object region image with another background image, and storing the third image in a storage apparatus.

37.

The image generation method according to supplementary note 36, executed by the computer further including, generating the third image as an image for learning or an evaluation of a discriminator that identifies the object.

38.

The image generation method according to supplementary note 37, executed by the computer, further including generating or updating the discriminator by using an image for the learning or the evaluation.

39.

The image generation method according to supplementary note 37 or 38, executed by the computer, further including evaluating identification accuracy of the discriminator by using an image for the learning or the evaluation.

40.

The image generation method according to any one of supplementary notes 36 to 39, wherein the object is a product.

41.

The image generation method according to any one of supplementary notes 36 to 40, executed by the computer, further including switching and displaying a plurality of first images each having a different content on the display surface of the display.

42.

The image generation method according to supplementary note 41, executed by the computer, further including displaying plain images having colors different from each other as the plurality of first images.

43.

The image generation method according to supplementary note 41, executed by the computer, further including displaying a moving image as the plurality of first images.

44.

A program causing a computer to execute the image generation method according to any one of supplementary notes 36 to 43.

The invention claimed is:

1. An image collection apparatus, comprising:

a display control unit switches and displays a plurality of first images each having a different content on a display surface of a display when an object placed on the display surface of the display is captured; and an image acquisition unit that acquires a plurality of second images being generated by photographing the object on a display surface of the display while the plurality of first images are switched and displayed, and stores, as images for learning or evaluation of a discriminator that identifies the object, the plurality of second images in a storage apparatus, wherein each of the first images includes noise information regarding a usage environment of the discriminator.

2. The image collection apparatus according to claim 1, further comprising a learning unit that generates or updates the discriminator by using the plurality of second images.

3. The image collection apparatus according to claim 1, further comprising an evaluation unit evaluates identification accuracy of the discriminator by using the plurality of second images.

4. The image collection apparatus according to claim 1, wherein the object is a product.

5. The image collection apparatus according to claim 1, wherein the display control unit displays plain images having colors different from each other as the plurality of first images.

6. An image collection system, comprising:

a display including a display surface being used as a placement surface of an object;

an image capturing apparatus that captures an object placed on the display surface of the display;

a display control unit that switches and displays a plurality of first images each having a different content on the display surface of the display when the object is captured; and an image acquisition unit that acquires a plurality of second images being generated by capturing the object on the display surface of the display while the plurality of first images are switched and displayed, and stores, as images for learning or evaluation of a discriminator that identifies the object, the plurality of second images in a storage apparatus wherein each of the first images includes noise information regarding a usage environment of the discriminator.

7. An image generation apparatus, comprising:

a display control unit that displays a predetermined first image on a display surface of a display when an object placed on the display surface of the display is photographed;

an image acquisition unit that acquires a second image being generated by capturing the object on the display surface of the display while the first image is displayed;

an extraction unit extracts an object region image indicating a region of the object from the second image; and an image generation unit that generates a third image by combining the object region image with a background image, and stores the third image in a storage apparatus.

8. The image generation apparatus according to claim 7, wherein the image generation unit generates the third image as an image for learning or an evaluation of a discriminator that identifies the object.

9. The image generation apparatus according to claim 8, further comprising a learning unit that generates or updates the discriminator by using an image for the learning or the evaluation.

10. The image generation apparatus according to claim 8, further comprising an evaluation unit that evaluates identification accuracy of the discriminator by using an image for the learning or the evaluation.

11. The image generation apparatus according to claim 7, wherein the object is a product.

12. The image generation apparatus according to claim 7, wherein the display control unit switches and displays a plurality of first images each having a different content on the display surface of the display.

13. The image generation apparatus according to claim 12, wherein the display control unit displays plain images having colors different from each other as the plurality of first images.

14. The image generation apparatus according to claim 12, wherein the display control unit displays a moving image as the plurality of first images.

* * * * *